US009405848B2

(12) United States Patent
Liang et al.

(10) Patent No.: US 9,405,848 B2
(45) Date of Patent: Aug. 2, 2016

(54) RECOMMENDING MOBILE DEVICE ACTIVITIES

(75) Inventors: Jisheng Liang, Bellevue, WA (US); Will Hunsinger, Tiburon, CA (US); Satish Bhatti, Seattle, WA (US)

(73) Assignee: VCVC III LLC, Seattle, WA (US)

( * ) Notice: Subject to any disclaimer, the term of this patent is extended or adjusted under 35 U.S.C. 154(b) by 149 days.

(21) Appl. No.: 13/233,879

(22) Filed: Sep. 15, 2011

(65) Prior Publication Data

US 2012/0084292 A1    Apr. 5, 2012

Related U.S. Application Data

(60) Provisional application No. 61/383,175, filed on Sep. 15, 2010.

(51) Int. Cl.
*G06F 7/00* (2006.01)
*G06F 17/30* (2006.01)

(52) U.S. Cl.
CPC .............................. *G06F 17/30899* (2013.01)

(58) Field of Classification Search
CPC .................................................. G06F 17/30899
See application file for complete search history.

(56) References Cited

U.S. PATENT DOCUMENTS

| 4,839,853 | A | 6/1989 | Deerwester et al. | 364/900 |
| 5,301,109 | A | 4/1994 | Landauer et al. | 364/419.19 |
| 5,317,507 | A | 5/1994 | Gallant | 364/419.13 |
| 5,325,298 | A | 6/1994 | Gallant | 364/419.19 |
| 5,331,556 | A | 7/1994 | Black, Jr. et al. | 364/419.08 |
| 5,377,103 | A | 12/1994 | Lamberti et al. | 364/419.08 |
| 5,619,709 | A | 4/1997 | Caid et al. | 395/794 |
| 5,634,051 | A | 5/1997 | Thomson | 395/605 |

(Continued)

FOREIGN PATENT DOCUMENTS

| EP | 0 280 866 | 9/1988 |
| EP | 0 597 630 | 7/2002 |

(Continued)

OTHER PUBLICATIONS

Abraham, "FoXQ—Xquery by Forms," Human Centric Computing Languages and Environments, Proceedings 2003 IEEE Symposium, Oct. 28-31, 2003, Piscataway, New Jersey, pp. 289-290.

(Continued)

*Primary Examiner* — Usmaan Saeed
*Assistant Examiner* — Paul Kim
(74) *Attorney, Agent, or Firm* — Ellen M. Bierman; Lowe Graham Jones PLLC

(57) ABSTRACT

Techniques for recommending mobile device activities, such as accessing mobile applications and/or mobile Web pages, are described. Some embodiments provide an Activity Recommendation System ("ARS") configured to recommend relevant activities for a user to perform with a mobile device, based on context of the mobile device. In one embodiment, the ARS recommends mobile applications based content items (e.g., Web pages, images, videos) that are being currently accessed via the mobile device. The ARS may process information about mobile applications and content items to determine semantic information, such as entities and/or categories referenced or associated therewith. The ARS may then use the semantic information to determine mobile applications that have semantic information that is at least similar to that of a content item accessed via a mobile device.

20 Claims, 14 Drawing Sheets

(56) References Cited

U.S. PATENT DOCUMENTS

| | | |
|---|---|---|
| 5,778,362 A | 7/1998 | Deerwester ............... 707/5 |
| 5,794,050 A | 8/1998 | Dahlgren et al. ............ 395/708 |
| 5,794,178 A | 8/1998 | Caid et al. ............... 704/9 |
| 5,799,268 A | 8/1998 | Boguraev ............... 704/9 |
| 5,848,417 A | 12/1998 | Shoji et al. ............... 707/102 |
| 5,857,179 A | 1/1999 | Vaithyanathan et al. ......... 707/2 |
| 5,884,302 A | 3/1999 | Ho ............... 707/3 |
| 5,933,822 A | 8/1999 | Braden-Harder et al. ........ 707/5 |
| 5,950,189 A | 9/1999 | Cohen et al. ............... 707/3 |
| 5,982,370 A | 11/1999 | Kamper ............... 345/356 |
| 6,006,221 A | 12/1999 | Liddy et al. ............... 707/5 |
| 6,006,225 A | 12/1999 | Bowman et al. ............... 705/5 |
| 6,026,388 A | 2/2000 | Liddy et al. ............... 707/1 |
| 6,061,675 A | 5/2000 | Wical ............... 706/45 |
| 6,064,951 A | 5/2000 | Park et al. ............... 704/8 |
| 6,122,647 A | 9/2000 | Horowitz et al. ............ 707/513 |
| 6,167,368 A | 12/2000 | Wacholder ............... 704/9 |
| 6,178,416 B1 | 1/2001 | Thompson et al. ............... 707/3 |
| 6,192,360 B1 | 2/2001 | Dumais et al. ............... 707/6 |
| 6,202,064 B1 | 3/2001 | Julliard ............... 707/5 |
| 6,246,977 B1 | 6/2001 | Messerly et al. ............... 704/9 |
| 6,363,373 B1 | 3/2002 | Steinkraus ............... 707/3 |
| 6,405,190 B1 | 6/2002 | Conklin ............... 707/3 |
| 6,411,962 B1 | 6/2002 | Kupiec |
| 6,460,029 B1 | 10/2002 | Fries et al. |
| 6,484,162 B1 | 11/2002 | Edlund et al. |
| 6,510,406 B1 | 1/2003 | Marchisio |
| 6,584,464 B1 | 6/2003 | Warthen |
| 6,601,026 B2 | 7/2003 | Appelt et al. |
| 6,728,707 B1 | 4/2004 | Wakefield et al. |
| 6,732,097 B1 | 5/2004 | Wakefield et al. |
| 6,732,098 B1 | 5/2004 | Wakefield et al. |
| 6,738,765 B1 | 5/2004 | Wakefield et al. |
| 6,741,988 B1 | 5/2004 | Wakefield et al. |
| 6,745,161 B1 | 6/2004 | Arnold et al. ............... 704/7 |
| 6,757,646 B2 | 6/2004 | Marchisio ............... 704/9 |
| 6,859,800 B1 | 2/2005 | Roche et al. ............... 707/3 |
| 6,862,710 B1 | 3/2005 | Marchisio ............... 715/501.1 |
| 6,904,433 B2 | 6/2005 | Kapitskaia et al. ............ 707/10 |
| 6,910,003 B1 | 6/2005 | Arnold et al. ............... 704/4 |
| 6,996,575 B2 | 2/2006 | Cox et al. ............... 707/102 |
| 7,051,017 B2 | 5/2006 | Marchisio ............... 707/3 |
| 7,054,854 B1 | 5/2006 | Hattori et al. ............... 707/3 |
| 7,171,349 B1 | 1/2007 | Wakefield et al. ............ 704/9 |
| 7,283,951 B2 | 10/2007 | Marchisio et al. ............ 704/9 |
| 7,398,201 B2 | 7/2008 | Marchisio et al. ............ 704/9 |
| 7,403,938 B2 | 7/2008 | Harrison et al. ............... 707/3 |
| 7,451,135 B2 | 11/2008 | Goldman et al. ............... 707/3 |
| 7,526,425 B2 | 4/2009 | Marchisio et al. ............ 704/9 |
| 7,752,200 B2 | 7/2010 | Scholl et al. ............... 707/730 |
| 7,788,084 B2 | 8/2010 | Brun et al. |
| 8,122,016 B1 | 2/2012 | Lamba et al. |
| 8,666,909 B2 | 3/2014 | Pinckney et al. ............... 706/11 |
| 2002/0007267 A1 | 1/2002 | Batchilo et al. ............... 704/9 |
| 2002/0010574 A1 | 1/2002 | Tsourikov et al. ............ 704/9 |
| 2002/0022956 A1 | 2/2002 | Ukrainczyk et al. ............ 704/9 |
| 2002/0059161 A1 | 5/2002 | Li ............... 707/1 |
| 2002/0078041 A1 | 6/2002 | Wu ............... 707/4 |
| 2002/0078045 A1 | 6/2002 | Dutta |
| 2002/0091671 A1 | 7/2002 | Prokoph ............... 707/1 |
| 2002/0103789 A1 | 8/2002 | Turnbull et al. ............... 707/3 |
| 2002/0120651 A1 | 8/2002 | Pustejovsky et al. |
| 2002/0156763 A1 | 10/2002 | Marchisio ............... 707/1 |
| 2003/0004716 A1 | 1/2003 | Haigh et al. ............... 704/238 |
| 2003/0101182 A1 | 5/2003 | Govrin et al. ............... 707/7 |
| 2003/0115065 A1 | 6/2003 | Kakivaya et al. ............ 704/270.1 |
| 2003/0115191 A1 | 6/2003 | Copperman et al. ............... 707/3 |
| 2003/0191626 A1 | 10/2003 | Al-Onzian et al. ............ 704/8 |
| 2003/0233224 A1 | 12/2003 | Marchisio et al. ............ 704/4 |
| 2004/0010508 A1 | 1/2004 | Fest et al. ............... 707/102 |
| 2004/0044669 A1 | 3/2004 | Brown et al. ............... 707/100 |
| 2004/0064447 A1 | 4/2004 | Simske et al. ............... 707/5 |
| 2004/0103090 A1 | 5/2004 | Dogl et al. ............... 707/3 |
| 2004/0125877 A1 | 7/2004 | Chang et al. ............... 375/240.28 |
| 2004/0167870 A1 | 8/2004 | Wakefield et al. ............... 707/1 |
| 2004/0167883 A1 | 8/2004 | Wakefield et al. ............... 707/3 |
| 2004/0167884 A1 | 8/2004 | Wakefield et al. ............... 707/3 |
| 2004/0167885 A1 | 8/2004 | Wakefield et al. ............... 707/3 |
| 2004/0167886 A1 | 8/2004 | Wakefield et al. ............... 707/3 |
| 2004/0167887 A1 | 8/2004 | Wakefield et al. ............... 707/3 |
| 2004/0167907 A1 | 8/2004 | Wakefield et al. ............ 707/100 |
| 2004/0167908 A1 | 8/2004 | Wakefield et al. ............ 707/100 |
| 2004/0167909 A1 | 8/2004 | Wakefield et al. ............ 707/100 |
| 2004/0167910 A1 | 8/2004 | Wakefield et al. ............ 707/100 |
| 2004/0167911 A1 | 8/2004 | Wakefield et al. ............ 707/100 |
| 2004/0221235 A1 | 11/2004 | Marchisio et al. ............ 715/534 |
| 2004/0243388 A1 | 12/2004 | Corman et al. ............... 704/1 |
| 2005/0027704 A1 | 2/2005 | Hammond et al. ............... 707/5 |
| 2005/0076365 A1 | 4/2005 | Popov et al. |
| 2005/0108001 A1 | 5/2005 | Aarskog ............... 704/10 |
| 2005/0108262 A1 | 5/2005 | Fawcett, Jr. et al. ............ 707/100 |
| 2005/0138018 A1 | 6/2005 | Sakai et al. ............... 707/3 |
| 2005/0144064 A1 | 6/2005 | Calabria et al. ............... 705/14 |
| 2005/0149494 A1 | 7/2005 | Lindh et al. ............... 707/3 |
| 2005/0177805 A1 | 8/2005 | Lynch et al. ............... 715/968 |
| 2005/0197828 A1 | 9/2005 | McConnell et al. ............... 704/9 |
| 2005/0210000 A1 | 9/2005 | Michard ............... 707/3 |
| 2005/0216443 A1 | 9/2005 | Morton et al. ............... 707/3 |
| 2005/0267871 A1 | 12/2005 | Marchisio et al. ............ 707/3 |
| 2006/0149734 A1 | 7/2006 | Egnor et al. ............... 707/7 |
| 2006/0224565 A1 | 10/2006 | Ashutosh et al. ............ 707/3 |
| 2006/0279799 A1 | 12/2006 | Goldman ............... 358/403 |
| 2007/0136326 A1* | 6/2007 | McClement et al. ......... 707/100 |
| 2007/0143300 A1 | 6/2007 | Gulli et al. |
| 2007/0156669 A1 | 7/2007 | Marchisio et al. ............ 707/74 |
| 2007/0209013 A1 | 9/2007 | Ramsey et al. ............... 715/769 |
| 2007/0233656 A1 | 10/2007 | Bunescu et al. ............... 707/3 |
| 2008/0005651 A1 | 1/2008 | Grefenstette et al. ......... 715/500 |
| 2008/0010270 A1 | 1/2008 | Gross ............... 707/5 |
| 2008/0059456 A1 | 3/2008 | Chowdhury et al. ............ 707/5 |
| 2008/0097975 A1 | 4/2008 | Guay et al. ............... 707/4 |
| 2008/0097985 A1 | 4/2008 | Olstad et al. ............... 707/5 |
| 2008/0120129 A1* | 5/2008 | Seubert ............... G06Q 10/06 705/35 |
| 2008/0208864 A1 | 8/2008 | Cucerzan et al. ............... 707/8 |
| 2008/0228720 A1 | 9/2008 | Mukherjee et al. ............ 707/3 |
| 2008/0235203 A1 | 9/2008 | Case et al. |
| 2009/0144609 A1 | 6/2009 | Liang et al. ............... 715/230 |
| 2009/0187467 A1* | 7/2009 | Fang et al. ............... 705/10 |
| 2009/0228439 A1 | 9/2009 | Manolescu et al. ............ 707/3 |
| 2009/0248678 A1 | 10/2009 | Okamoto ............... 707/5 |
| 2010/0010994 A1* | 1/2010 | Wittig et al. ............... 707/6 |
| 2010/0046842 A1 | 2/2010 | Conwell ............... 382/218 |
| 2010/0048242 A1 | 2/2010 | Rhoads et al. ............... 455/556.1 |
| 2010/0299326 A1 | 11/2010 | Germaise ............... 707/728 |
| 2011/0173194 A1 | 7/2011 | Sloo et al. ............... 707/736 |
| 2012/0254188 A1 | 10/2012 | Koperski et al. |
| 2013/0124510 A1 | 5/2013 | Guha |

FOREIGN PATENT DOCUMENTS

| | | |
|---|---|---|
| WO | WO 00/14651 | 3/2000 |
| WO | WO 00/57302 | 9/2000 |
| WO | WO 01/22280 | 3/2001 |
| WO | WO 01/80177 | 10/2001 |
| WO | WO 02/27536 | 4/2002 |
| WO | WO 02/33583 | 4/2002 |
| WO | WO 03/017143 | 2/2003 |
| WO | WO 2004/053645 | 6/2004 |
| WO | WO 2004/114163 | 12/2004 |
| WO | WO 2006/068872 | 6/2006 |

OTHER PUBLICATIONS

Cass, "A Fountain of Knowledge," IEEE Spectrum Online, URL: http://www.spectrum.ieee.org/WEBONLY/publicfeature/jan04/0104comp1.html, download date Feb. 4, 2004, 8 pages.

Feldman et al., "Text Mining at the Term Level," *Proc. of the 2nd European Symposium on Principles of Data Mining and Knowledge Discover*, Nantes, France, 1998.

Ilyas et al., "A Conceptual Architecture for Semantic Search Engine," IEEE, INMIC, 2004, pp. 605-610.

(56) References Cited

OTHER PUBLICATIONS

Jayapandian et al., "Automating the Design and Construction of Query Forms," Data Engineering, Proceedings of the 22$^{nd}$ International Conference IEEE, Atlanta, Georgia, Apr. 3, 2006, pp. 125-127.

Kaiser, "Ginseng—A Natural Language User Interface for Semantic Web Search," University of Zurich, Sep. 16, 2004, URL=http://www.ifi.unizh.ch/archive/mastertheses/DA__Arbeiten__2004/Kaiser__Christian.pdf, pp. 1-84.

Liang et al., "Extracting Statistical Data Frames from Text," SIGKDD Explorations, Jun. 2005, vol. 7, No. 1, pp. 67-75.

Littman et al., "Automatic Cross-Language Information Retrieval using Latent Semantic Indexing," In Grefenstette, G., editor, Cross Language Information Retrieval. Kluwer, 1998.

Nagao et al., "Semantic Annotation and Transcoding: Making Web Content More Accessible," *IEEE Multimedia, IEEE Computer Society, US.* 8(2):69-81, Apr. 2001.

Nguyen et al., "Accessing Relational Databases from the World Wide Web," SIGMOD Record, ACM USA, Jun. 1996, vol. 25, No. 2, pp. 529-540.

Pohlmann et al., "The Effect of Syntactic Phrase Indexing on Retrieval Performance for Dutch Texts," Proceedings of RIAO, pp. 176-187, Jun. 1997.

Sowa, John F.; "Semantic Networks"; available at http://www.jfsowa.com/pubs/semnet.htm; 1992; downloaded on Feb. 5, 2015, 29 pages.

Trehub, Arnold; "Chapter 6: Building a Semantic Network"; The Cognitive Brain; The MIT Press, Cambridge, MA; 1991, pp. 99-115.

\* cited by examiner

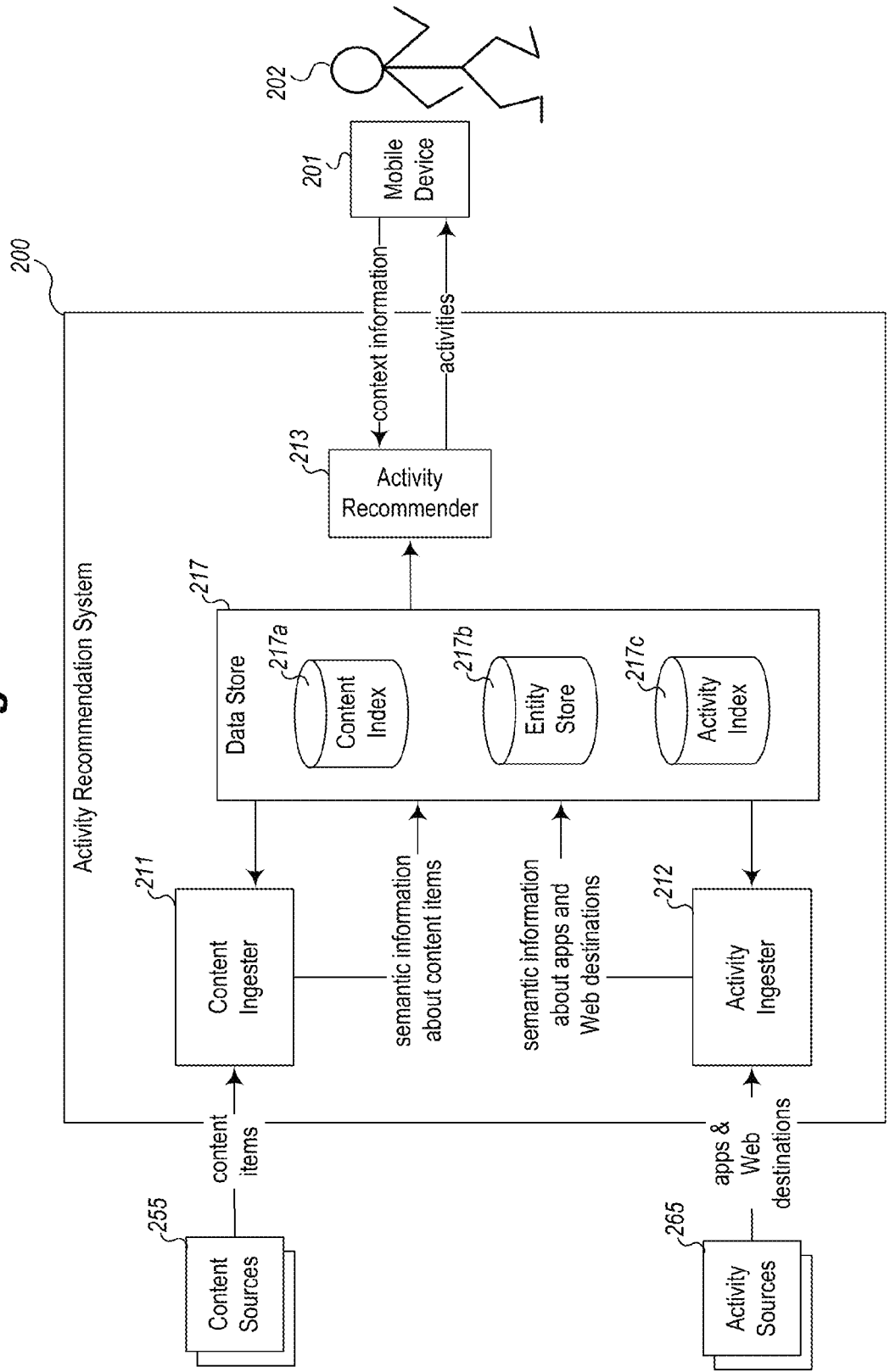

Related Activities

It's On To New York

The Seattle Mariners are heading to New York, after winning their fourth consecutive series. They beat the 42-79 Baltimore Orioles on Wednesday night behind 2-4 David Pauley, 6-5. It was a shaky win to say the least, but we will take them any way the M's deliver them.

Related Apps:

☆ Seattle Mariners Fan App

☆ Major League Baseball App

☆ Tickets App

Related Websites:

☆ Mariners Mobile Blog

☆ Yankees Fan Website

View All (12)

*Fig. 3E*

Related Activities
Related Apps:
 Calorie Counter App
 Dieting Support App
 Personal Health News App
Related Websites:
 Famous Dieting Blog
 Medical Research Summary Website
View All (18)
*Fig. 3G*

RECOMMENDING MOBILE DEVICE ACTIVITIES

TECHNICAL FIELD

The present disclosure relates to methods, techniques, and systems for recommending mobile device activities and, more particularly, to methods, techniques, and systems for recommending mobile applications and/or mobile Websites based on context of the mobile device.

BACKGROUND

As smart phones (e.g., Apple's iPhone and Google's Android) and other mobile devices (e.g., Apple's iPad) gain popularity, smart phone users are increasingly using diverse mobile applications to perform everyday activities, such as email, social networking, news reading, banking, and the like. A typical smart phone user may use 20-30 different applications installed on his/her smart phone. In addition, many Web destinations are disaggregating their sites, and making pieces or portions of those sites into mobile applications that can be downloaded to, and installed on, smart phones. As the number of applications grows, users are increasingly faced with the problem of searching through an increasing number of applications in order to find applications that are relevant or useful to tasks they wish to perform. This scenario is similar to the early days of the Web. That is, as the size of the Web increased, more scalable and efficient solutions (e.g., better search engines) were needed to help users better navigate and search for relevant Web sites.

A difference between mobile platforms and the Web is that, due to the nature of mobile devices (e.g., small screen size, limited input modalities) and how users interact with those devices, user interaction is often more focused and vertically-oriented. Thus, the traditional keyword-based search engines that work well on the Web are no longer sufficient for mobile platforms. It is frequently cumbersome to type in or copy and paste keyword queries on a mobile device, and then have to browse dozens of results before finding relevant results.

As another problem, there is little or no interaction between mobile applications, and no common standards for intercommunication. Thus, it is not be convenient or efficient to analyze information or user's actions with respect to one application, and then use that information to perform functions with another application

BRIEF DESCRIPTION OF THE DRAWINGS

FIG. 2 illustrates an example block diagram of an example embodiment of an activity recommendation system.

FIGS. 3A-3I illustrate example screen displays provided by example embodiments of an activity recommendation system.

DETAILED DESCRIPTION

Figure 1:
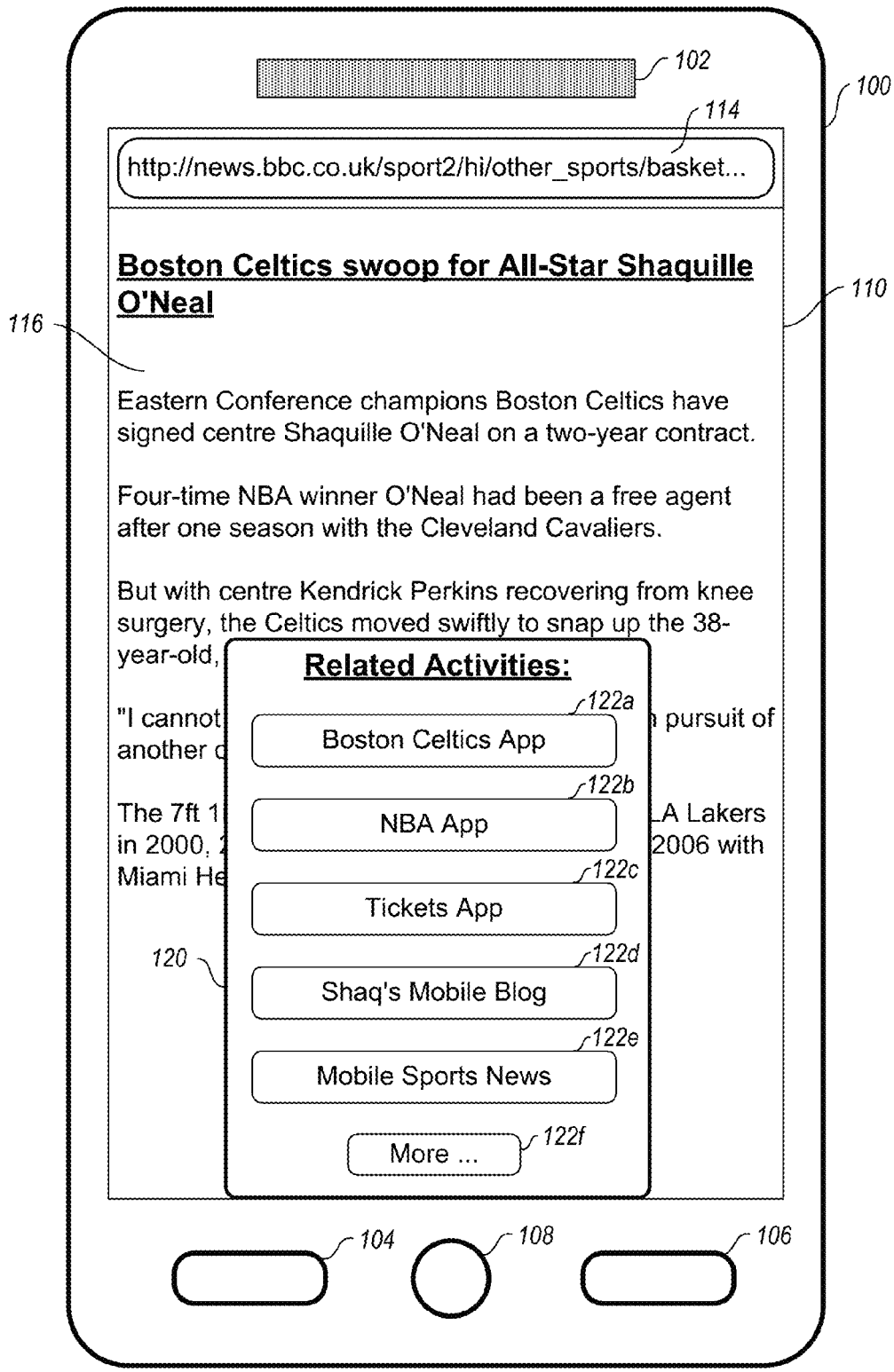
FIG. 1 illustrates an example mobile device configured to provide activity recommendations according to an example embodiment.

Embodiments described herein provide enhanced computer- and network-based methods and systems for recommending mobile device activities. Example embodiments provide an activity recommendation system ("ARS") configured to recommend relevant activities for a user to perform with a mobile device, based on context of the mobile device. In one embodiment, the ARS recommends mobile applications based on content items (e.g., Web pages, images, videos) that are being currently accessed via the mobile device. The ARS may process content items to determine semantic information, such as entities that are referenced by, and categories (also called "facets") associated with, those content items. In addition, the ARS may process information about mobile applications to determine semantic information about those mobile applications, such as entities and/or categories related to those mobile applications. Then, when a user accesses a content item, the ARS determines one or more mobile applications that have semantic information that is at least similar to that of the accessed content item, such as by having associated entities and/or categories that are at least similar to the entities and/or categories of the accessed content item.

Mobile device context may include information about content items that are currently being presented, prepared, viewed, or otherwise processed by the mobile device. A content item may include text, audio, image, and/or video data that describes one or more entities and relationships between those entities. The ARS consumes content items and determines semantic information contained in those content items, including identifying the entities and relationships referenced or otherwise covered by those content items. Entities include people, places (e.g., locations), organizations (e.g., political parties, corporations, groups), events, concepts, products, substances, and the like. Table 1, below, includes a list of example entity types. Fewer or more can be made available. Other semantic information determined by the ARS includes indirect or higher-order semantic information, such as categories, facets, types, or classes associated with the identified entities, taxonomies, and/or relationships. The ARS may consume or otherwise attend to other information about or contained in a content item, including various types of meta-information, such as titles, authors, publication dates, summaries, quotations, and the like. In other embodiments, mobile device context may include other information about the operational state of the mobile device, including its location (e.g., GPS coordinates, cell identifier, zip code), hardware state and/or conditions (e.g., processor and/or memory capacity/utilization, display configuration and/or settings, error conditions), software state and/or conditions (e.g., application identifiers and/or version information, error conditions), and the like.

Various types of mobile device activities may be recommended by the ARS. In some embodiments, a recommended activity may be to access (e.g., execute, download, install) a mobile application (an "app") that includes instructions that execute on, or are otherwise processed by, the mobile device to perform one or more actions, functions, or activities. A mobile application may operate entirely on the mobile device, but more typically, it will cooperate with one or more network accessible modules, such as Web servers, application servers, database systems, or the like. In other embodiments, a recommended activity may be to access a Website that is accessible by the mobile device (a "mobile Website"). In at least some cases, the recommended Website is adapted, customized, optimized, or otherwise configured for utilization by mobile devices, such as by reducing display requirements (e.g., by reducing screen layout size), reducing bandwidth utilization (e.g., by minimizing use of images), and the like.

FIG. 1 illustrates an example mobile device configured to provide activity recommendations according to an example embodiment. In particular, FIG. 1 illustrates a mobile device 100 that is a smart phone and that includes a speaker 102, hardware buttons 104 and 106, a pointing device 108, and a touch screen 110. Other components/modules of the device 100 are not shown, such as a microphone, other hardware controls, power connections, network connections, and the like. In the illustrated example, the device 100 is executing a Web browser application, which is displaying on the touch screen 110 a Web page 116 received via a uniform resource identifier ("URI") or uniform resource locator ("URL") 114. In addition, the device 100 is displaying an activity recommender 120 that presents recommended activities based on the context of the device 100.

As noted, the ARS processes content items to determine semantic information such as entities, relationships between those entities, and categories/facets associated with those entities. Here the ARS processes Web page 116, which includes information about a transaction for a basketball player, in particular, the acquisition of Shaquille O'Neal by the Boston Celtics. In processing the Web page 116, the ARS may thus identify entities including the Boston Celtics, the NBA, Shaquille O'Neal, the Cleveland Cavaliers, and the like. In addition, the ARS may identify categories associated with the identified entities, such as sports team (the Boston Celtics and Cleveland Cavaliers are sports teams), sports league (the NBA is a sports league), athlete (Shaquille O'Neal is an athlete), and the like. As also noted, the ARS processes information about various activities (e.g., mobile applications and mobile Websites) to determine semantic information, such as entities and/or categories, about or related to those activities. Based on semantic information about a content item and various activities, the ARS determines one or more relevant activities. In this example, the ARS determines, based on the entities and/or categories referenced by Web page 116, one or more activities that are relevant to Web page 116.

The determined activities are presented via the activity recommender 120. Here, the example activity recommender 120 is a "pop up" user interface control that overlays the currently executing application in response to a user input that requests activity recommendations. The activity recommender 120 includes controls 122a-122f. The controls 122a-122f are software buttons, but in other embodiments could be other types of user selectable controls, such as links, menu items, icons, or the like. Each of the controls 122a-122e includes an indication of one determined activity. In particular, controls 122a-122e respectively indicate a Boston Celtics mobile application ("Boston Celtics App"), an NBA mobile application ("NBA Mobile App"), a ticket purchasing mobile application ("Tickets App"), Shaquille O'Neal's personal mobile Website ("Shaq's Mobile Blog"), and a mobile Website dedicated to sports news ("Mobile Sports News"). Each of controls 122a-122e, when selected by a user, facilitates its indicated activity. For example, if a user selects control 122a, the user will be presented with the option of downloading and installing the indicated Boston Celtics mobile application. Or, if the user selects control 122d, the user will be presented with the option of accessing Shaquille O'Neal's mobile Website.

Note that the recommended activities are not limited to entities that are directly referenced by the Web page 116. For example, the recommender 120 includes control 122c indicating a ticket purchasing mobile application, based on information such as that the Boston Celtics are a professional sports team and that the ticket purchasing mobile application can be used to purchase tickets for professional sports teams. In addition, the recommender 120 includes control 122d indicating a sports news Website, based on information such as that Shaquille O'Neal plays basketball and that the sports news Website carries news stories about basketball.

FIG. 2 illustrates an example block diagram of an example embodiment of an activity recommendation system. In particular, FIG. 2 illustrates an activity recommendation system ("ARS") 200 that includes a content ingester 211, an activity ingester 212, an activity recommender 213, and a data store 217. The data store 217 includes a content index 217a, an entity store 217b, and an activity index 217c.

In the illustrated embodiment, ARS 200 functions at least in part as a semantic search and discovery system for mobile applications. As will be described below, portions of the ARS 200, including the content ingester 211, the activity ingester 212, and the data store 217 cooperate to function as a search engine to locate, identify, or otherwise determine mobile applications and/or Websites for use on, or access by, a mobile device or other type of system. Other portions of the ARS 200, including the activity recommender 213, use the semantic search and discovery functionality of the ARS 200 to locate applications to recommend, and to provide such recommendations to mobile devices or other clients. In other embodiments, third-party applications or users may also utilize the provided semantic search and discovery functionality directly, such as via an application program interface or Web-based search user interface.

The content ingester 211 determines semantic information about content items obtained from various content sources 255, and stores the determined information in the data store 217. The content ingester 211 receives and indexes content items from various content sources 255, including sources such as Web sites, Blogs, news feeds, video feeds, and the like. The content ingester 211 may also receive content from non-public or semi-public sources, including subscription-based information services, access-controlled social networks, and the like. The content ingester 211 processes data included within content items (e.g., text, images, video) and meta-data about content items (e.g., author, title, date, source).

The content ingester 211 processes the received content items to identify entities and relationships that are referenced therein. Various automatic and semi-automatic techniques are contemplated for identifying entities within content items. In one embodiment, the content ingester 211 uses natural language processing techniques, such as parts of speech tagging and relationship searching, to identify sentence components such as subjects, verbs, and objects, and to disambiguate and identify entities. Example relationship searching technology, which uses natural language processing to determine relationships between subjects and objects in ingested content, is described in detail in U.S. Pat. No. 7,526,425, issued on Apr. 28, 2009, and entitled "METHOD AND SYSTEM FOR EXTENDING KEYWORD SEARCHING FOR SYNTACTICALLY AND SEMANTICALLY ANNOTATED DATA," and entity recognition and disambiguation technology is described in detail in U.S. patent application Ser. No. 12/288,158, filed Oct. 15, 2008, and entitled "NLP-BASED ENTITY RECOGNITION AND DISAMBIGUATION," both of which are incorporated herein by reference in their entirety. The use of relationship searching, enables the ARS 200 to establish second order (or greater order) relationships between entities and to store such information.

For example, given a sentence such as "Sean Connery starred in Goldfinger," the content ingester 211 may identify "Sean Connery" as the sentence subject, "starred" as the sentence verb, and "Goldfinger" as the sentence object. The identified subjects and objects are then added as disambiguated entities to the entity store 217b. In the above example, "Sean Connery" and "Goldfinger" would be added to the entity store 217b. The identified verbs can then be used to define relationships between the identified entities. These defined relationships (e.g., stored as subject-verb-object or SAO triplets, or otherwise) are then stored in the data store 217, either as part of the entity store 217b or a separate relationship index. Thus, in the above example, a representation of the fact that the actor Sean Connery starred in the film Goldfinger would be added to a relationship index.

The content ingester 211 may determine various kinds of information about entities and relationships. In one embodiment, the content ingester 211 determines categories or facets, which include finely grained characteristics of entities, such as entity types, classes, roles, qualities, functions, and the like. For example, the entity Sean Connery may have various associated facets, including that of actor, producer, knight, and Scotsman. The facet information for entities may be also stored in the entity store 217b. Table 2, below, includes a list of example facets. Fewer, greater, or different facets may be incorporated or utilized.

The content ingester 211 may also rank determined entities by their importance and relevance to a particular content items main subject. In one embodiment, such a ranking is based on various factors, including the number of times an entity is mention in text of the content item; the position of each mention, such as entities appearing in document title are weighted more, entities appearing earlier in a document are weighted more than the entities appearing later, entities appearing in boilerplate text (typical for news articles or blogs on the Web) are weighted less, and the like; penalties for certain types of entities, such as by decreasing the weight of a publisher entity if the publisher of a document is referenced in the text of the document, or by decreasing the weight of location names; and the like.

The entity store 217b is a repository of entities (e.g., people, organization, place names, products, events, things), concepts, and other semantic information. In at least some embodiments, the entities in the entity store 217b are related such that they form a semantic network, taxonomy, or graph. The entities in the entity store 217b are associated with categories/facets. The categories themselves are organized into one or more taxonomies based on taxonomic relations such as is-a, part-of, member-of, and the like. In addition, entities are associated with certain properties, such as name and aliases, a unique identifier, types and facets, descriptions, and the like. Entities may also have type/facet-specific properties. For example, for a sports athlete, common properties may include: birth place, birth date, sports teams, player positions, awards, and the like. Note that some of the properties are relational, that is, the property value may itself be another entity in the entity store 217b. For example, the team property for an athlete may be link to a sports team entity in the entity store 217b, and vice versa. Thus, the entities in the entity store 217b are interconnected through the property links, creating a semantic network or graph. Certain taxonomic relations are represented as such property links (e.g., the "member-of" relation for the players-team relation, and team-league relation in the sports domain). In some embodiments, the entities, their taxonomic paths and/or properties are extracted from one or more structured and semi-structured sources (e.g., Wikipedia). In other embodiments, the process of identifying entities may be at least in part manual. For example, entities may be provisionally identified by the content ingester 211, and then submitted to humans for editing, finalization, review, and/or approval.

The content ingester 211 also records an entry for each processed document in the content index 217a. In some embodiments, the content index 217a associates content items with one or more entities and categories, and vice versa, in order to support efficient searches such as searches for content items having a particular entity or for categories associated with a particular content item. For example, given an entity or facet, the ARS 200 may provide a list of content items that reference that facet. In addition, given an indication of a content item, the ARS may provide a list of entities or facets referenced by that content item.

The activity ingester 212 determines semantic information about activities, such as mobile applications or Websites, and stores the determined information in the data store 217. The activity ingester 212 determines semantic information about activities by using techniques such as those described with respect to the content ingester 211. As discussed further below, the activity ingester 212 processes information about activities, such as text documents describing mobile applications, and determines semantic information based upon the processed information. The activity ingester 212 determines semantic information sufficient to support searches for applications or other activities using semantic queries. For example, given an entity, the ARS 200 can provide a ranked list of activities about or related to that entity. As another example, given a category or facet, the ARS 200 can provide a ranked list of activities about or related to that category.

In one embodiment, the activity ingester 212 crawls and pulls feeds from various activity sources 265, such as mobile application "stores," such as Apple's iTunes App Store for iPhone and iPad, and Google's Android Market for mobile applications running on Android phones. In addition, the activity ingester 212 crawls or pulls feeds from certain mobile Websites, such as Fandango sites for listing movie show times and purchasing tickets; Stubhub sites for event tickets; Amazon.com sites for purchasing productions such as albums, books, videos, and the like; Netflix site for renting videos; and the like.

In one embodiment, an activity source 265 provides a feed (e.g., RSS feed) of information about mobile applications available at that source. The mobile applications described in the feed are ranked by a popularity measure, such as number of downloads. In addition, for each mobile application, the feed may include the following types of information: an identifier (e.g., a URL), a title, a summary (e.g., a text, HTML, or XML description), a category, a publisher name, a price, a time stamp, a ranking, and the like. The activity ingester 212 may also use information from other sources, such as reviews of mobile applications (e.g., posted on technology news sites), instructions or help files (e.g., included as part of an application distribution, posted or provided by an application publisher), or the like.

The activity ingester 212 processes the textual components of the received information, such as the title, summary, and/or description, and determines the entities and facets that are referenced therein. The activity ingester 212 then records, in the activity index 217c, an association between each processed application and at least some of the corresponding determined entities and facets. In some embodiments, the activity ingester 212 limits its consideration to some predetermined number (e.g., the top five) entities or facets. In order to support efficient search queries, the activity ingester 212 may also index the recorded associations in an inverted manner, such that for each entity/facet, a list of applications that reference or are otherwise related to that entity/facet can be returned. In addition, the activity ingester 212 may update its mappings and other information frequently, such as on a daily basis, such that new or newly popular applications can be identified.

A similar approach to that described above can be utilized to determine semantic information about mobile Websites. For example, the activity ingester 212 may crawl various Websites in order to identify those that host mobile content. In other embodiments, one or more mobile Websites may be manually identified. Then, for each identified mobile Website, the activity ingester 212 may further process content associated with that Website (e.g., instructions for use, descriptions) to determine semantic information such as various entities and/or facets that describe the function, operation, category, or domain of the mobile Website. Then, the determined semantic information is stored in the activity index 217c, such that the ARS 200 can efficiently answer queries about mobile Websites that reference or are otherwise related to particular entities or facets.

The activity recommender 213 receives context information from a mobile device 201 used by a user 202, and in response, returns indications of relevant activities. For example, if the user 202 is browsing a particular Web page with the device 201, an indication of the Web page may be transmitted to the activity recommender 213, and in response the activity recommender provides a list of activities that are relevant to the Web page. As will be discussed below, the device 201 may include a client-side module that provides context information to the activity recommender 213. The client-side module may take various forms or be integrated into the device in various ways, such as part of the operating system of the device 201, part of an application that executes on the device 201, or the like.

When the activity recommender 213 receives an indication of a Web page or other content item, the activity recommender 213 identifies a list of entities referenced by the Web page, ranked by their relevance and importance to the Web page. Each entity is also associated with one or more facets, such as its main or primary facets (e.g., as determined by some ranking of importance) and/or a predetermined number (e.g., five, ten) facets. Note that in some cases, such processing may have been previously performed (e.g., by the content ingester 211), such that identifying referenced entities is merely a matter of accessing an index of such information. Then, for each entity referenced by the Web page, the activity recommender 212 determines a ranked list of recommended activities. For each entity, one or more of the following approaches are used to find relevant activities (e.g., mobile applications): (1) locate mobile applications about the entity specifically; (2) locate mobile applications based on other entities directly related to the given entity, by using the relations derived from the semantic network that links together entities in the entity store 217b; and (3) locate mobile applications based on one or more facets of the given entity, as well as the taxonomic hierarchy of each facet.

In some embodiments, the activity recommender 213 begins by searching for applications that are very specific to the given entity. Then, the activity recommender 213 gradually relaxes the restriction, by finding applications related to the entity's facets or related entities. For example, given the entity "Kobe Bryant" of the NBA's Los Angeles Lakers, the activity recommender 213 may construct a list of recommendations that includes mobile applications that are specific to the player himself, mobile applications about the Los Angeles Lakers, mobile applications about basketball and/or the NBA, and mobile applications about sports in general, such as a sports trivia application, ESPN sports scores application, or the like. Related applications (e.g., a Lakers application, an ESPN sports scores application) are identified by taking advantage the semantic properties and relations from the entity store 217b. For example, given the entity "Kobe Bryant," the relevant properties may include: facet=basketball player; domain=sports; team=Los Angeles Lakers; sports league=NBA. Note that the team and sports league properties link to other entities in the entity store 217b, namely "Lakers" and "NBA." Given the identifier of each entity, the activity recommender 213 looks up relevant mobile applications from the activity index 217c (e.g., applications for Lakers, and applications for NBA). In other words, the activity recommender 213 traverses ("rolls up") semantic hierarchies or interconnections represented in the entity index 217 as necessary to find related applications. For example, the activity recommender 213 can roll up the is-a taxonomic hierarchy to determine that Kobe Bryant is an NBA basketball player, that an NBA basketball player is a basketball player, and that a basketball player is an athlete, and then use that information to locate applications about or for athletes generally. As another example, the activity recommender 212 can roll up the member-of relations to determine that a basketball player is a member of a basketball team, and that a basketball team is a member of a basketball league, and then use that information to locate applications about basketball leagues.

The relations or taxonomic paths used by the activity recommender 213 may be specified with respect to categories/facets or other kinds of semantic information. The specific relations or taxonomic paths can be determined manually or through an automated data mining process. For example, given a basketball_player facet, the data mining process may determine the most popular and unique relations and properties. In addition, the particular facets or related entities to use to find applications for a given entity may also be driven by a data mining process. For example, for a given entity, other entities or facets that are closely related may be determined by mining the latest news to identify timely connections between various entities. In some cases, the number of relations or paths to utilize may be determined manually or programmatically. For example, in some embodiments the activity recommender 213 may be configured to consider at most N (an integer number) taxonomic paths, where N is determined by user preference, operator setting, and/or some data mining technique.

Other types of context information may be used by the activity recommender 213. For example, in addition to (or instead of) analyzing the content that user 202 is accessing, the activity recommender 213 may use location information associated with the user 202, such as GPS coordinates provided by the device 201, an address or portion thereof associated with the user (e.g., a home address or zip code determined by reference to an account of the user), or the like. When purchasing tickets or performing some other transaction/activity, such location information may be used to determine a default value for a location required as part of the transaction, such as a shipping address, a home address, a venue location, or the like. In other cases, recommendations may be weighted or targeted based on a location associated with a user (e.g., current location, home address), so as to provide recommendations that are geographically relevant to the user. For example, if the user resides in Los Angeles and is reading a news story about a game between the Los Angeles Lakers and the Boston Celtics, the activity recommender 213 may prefer (e.g., emphasize, weight, rank) activities that are more relevant to Los Angeles (e.g., Lakers game schedule, Lakers tickets) over those that are more relevant to Boston (e.g., Celtics game schedule).

As another example, context information may include information about what applications are or are not already installed on a mobile device. In some embodiments, targeted or related recommendations may be made based on the existence of a particular application on a mobile device. For example, if a user has a particular eBook reader or other media viewer/player installed on his mobile device, the activity recommender 213 may recommend a relevant book or other media package that is compatible with the installed media viewer. Thus, if the user is reading a news article about President Obama, the activity recommender 213 may recommend an eBook that is by or about President Obama and that is compatible with an eBook reader on the mobile device.

In other embodiments, context information may be based on the activities of other users. For example, through collaborative filtering or other data mining techniques, it may be determined that users who purchased a first application typically also purchased a second application. Then, when recommending applications to a user who has purchased the first application, the second application may be ranked more highly. In other embodiments, user preferences may be determined based on explicit feedback for provided recommendations (e.g., via a thumbs up/down user interface control) and/or implicit feedback based on whether or not users accept recommendations. Such user preferences may be collected and aggregated over a large user population and used to improve recommendation quality. In addition, such user preferences can be linked or otherwise utilized in conjunction with demographic information about users, to improve or better target recommendations.

In addition, although the described techniques for activity recommendation are illustrated primarily with respect to textual content, other types of content are contemplated. For example, other embodiments may utilize at least some of the described techniques to perform or facilitate the recommendation of activities based on other types of content, including advertisements, audio (e.g., music), video, images, and the like. In some embodiments, the ARS 200 is configured to ingest video streams (e.g., live streaming of sports games) in a similar fashion. In particular, the ARS 200 may obtain text content from the stream via either closed captions or speech recognition. Then, the ARS 200 analyzes the obtained text content as discussed above, such that when particular entities or concepts are recognized, the ARS 200 recommends relevant activities. For example, the ARS 200 may consume a live stream of a baseball game or other sporting event, and recommend mobile applications or Websites dedicated to particular players when their names are mentioned.

Furthermore, the described techniques are not limited to the specific architecture shown in FIG. 2. For example, in some embodiments, content and activity ingestion may be performed by another (possibly external or remote) system or component, such as a stand-alone mobile application search and discovery system. In other embodiments, the ARS 200 may not interact directly with users, but rather provide user interface components (e.g., recommender widgets, plug-ins) that may be embedded or otherwise incorporated in third-party applications or systems, such as Web sites, smart phones, desktop systems, and the like.

FIGS. 3A-3I illustrate example screen displays provided by example embodiments of an activity recommendation system. In particular, FIGS. 3A-3I depict screen displays provided by various mobile applications that have each been integrated with, or are otherwise interacting with, the activity recommendation system. The illustrated mobile applications include a domain-based content recommender, a Web browser, and a video application.

Figure 3A:
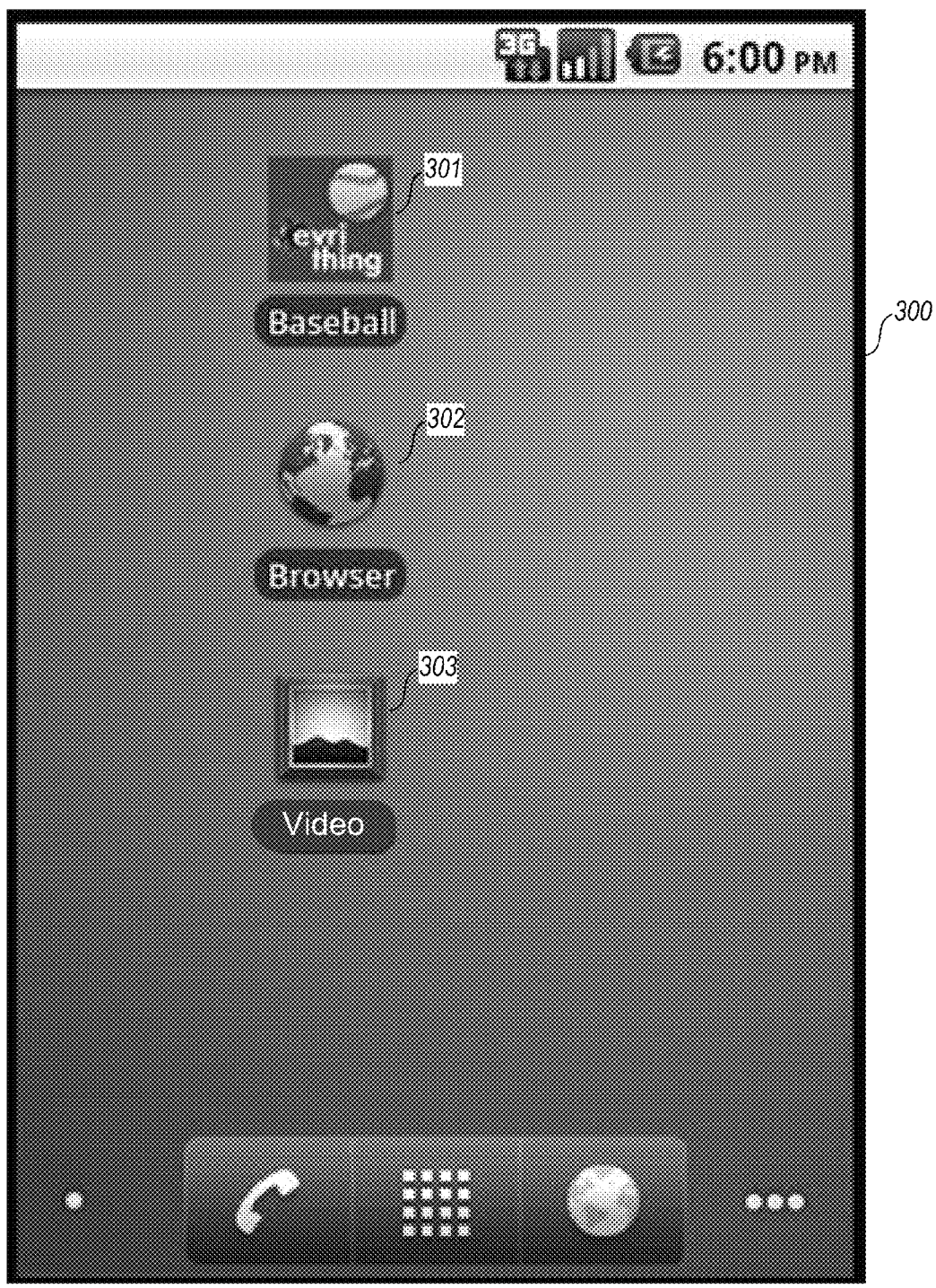

FIG. 3A shows a home screen provided by a mobile device. In particular, FIG. 3A illustrates a screen 300, such as may be part of the mobile device 100 described with respect to FIG. 1. The screen 300 is displaying three icons 301-303. Icon 301, when selected by a user, initiates execution of a domain-based content recommender application that includes facilities for recommending activities, as described further with respect to FIGS. 3B-3E. Techniques for content recommendation are described further in U.S. patent application Ser. No. 12/288, 349, filed Oct. 16, 2008, and entitled "NLP-BASED CONTENT RECOMMENDER," which is incorporated herein by reference in its entirety. Icon 302, when selected by a user, initiates execution of a mobile Web browser that can browse a Web site that includes an activity recommender widget, as described further with respect to FIGS. 3F-3G. Icon 303, when selected by a user, initiates execution of a mobile video application that interacts with facilities for recommending activities, as described further with respect to FIGS. 3H-3I.

FIGS. 3B-3E illustrate activity recommendation integrated into a mobile application that is executing on a mobile device. In particular, FIGS. 3B-3E illustrate operation of a domain-based content recommendation application that includes facilities for activity recommendation. The illustrated domain-based content recommendation application provides content recommendations with respect to baseball. Content recommendations may include Web pages, videos, audio, and the like. Content recommenders configured for other domains are contemplated, including celebrity gossip, other sports (e.g., basketball), news topic areas (e.g., business news, environmental news, politics), hobbies or lifestyle domains (e.g., cooking, dieting, personal health), and the like.

Figure 3B:
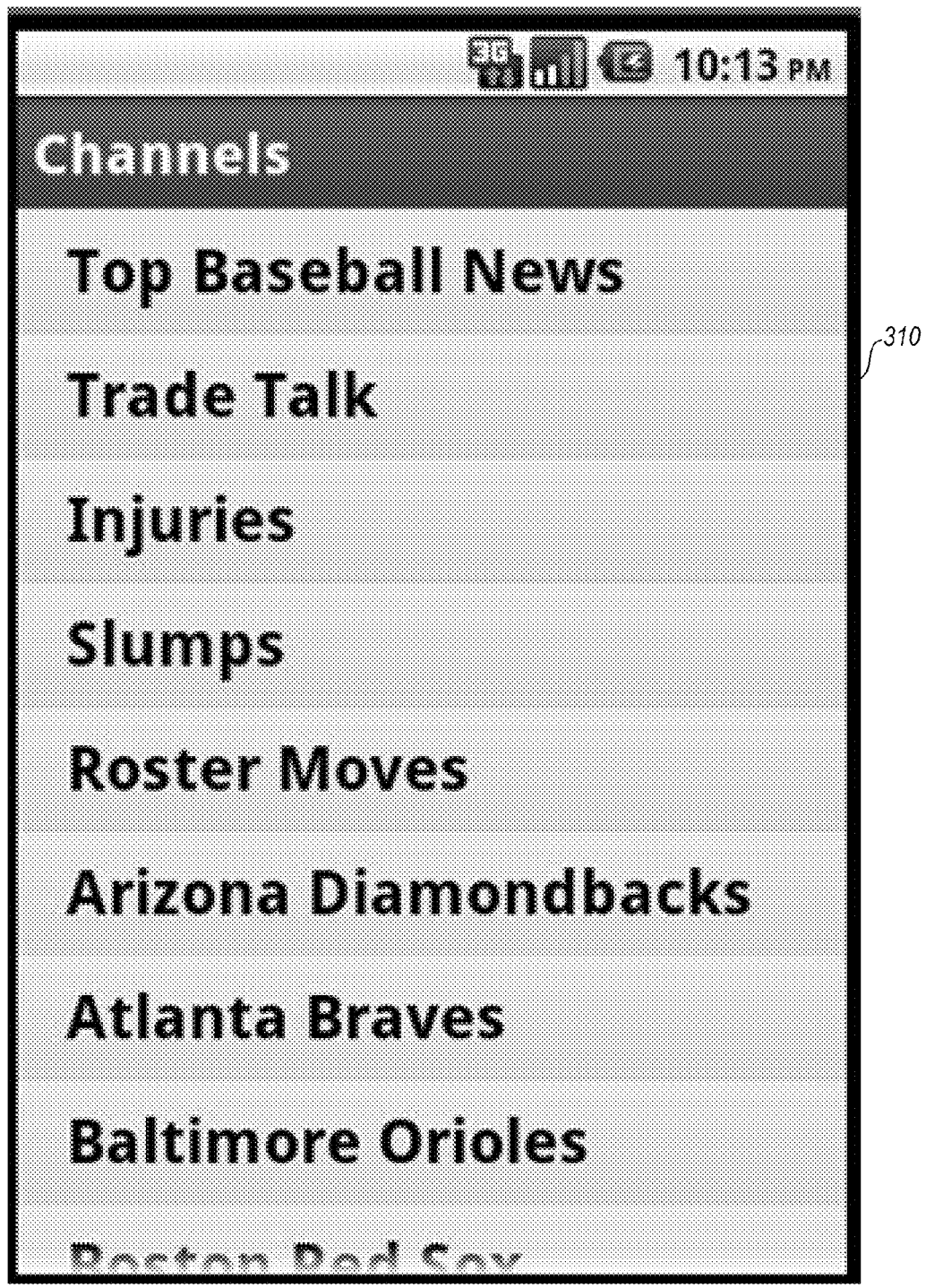

FIG. 3B illustrates a home screen 310 of the content recommendation application. The home screen 310 organizes content recommendations into topics, here called "channels." For example, the home screen 310 includes indications of channels for Top Baseball News, Trade Talk, Injuries, as well as various teams (e.g., Atlanta Braves). When the user selects one of the indicated channels a content recommendation screen is displayed, as described next.

Figure 3C:

FIG. 3C illustrates a content recommendation screen 320 of the content recommendation application. The screen 320 is presented in response to a user selection of a channel (not shown in FIG. 3B) for the Seattle Mariners baseball team. The screen 320 includes content snippets 321-323 that each provide a title and summary for a corresponding content item that is related to the selected channel, in this case the Seattle Mariners. Each snippet 321-323 is interactive, in that it can be selected to obtain the corresponding content item, as described with respect to FIG. 3D. In addition, each snippet 321-323 includes a control, such as control 324 that can be selected by a user to obtain activity recommendations with respect to the corresponding content item, as described with respect to FIG. 3E.

Figure 3D:
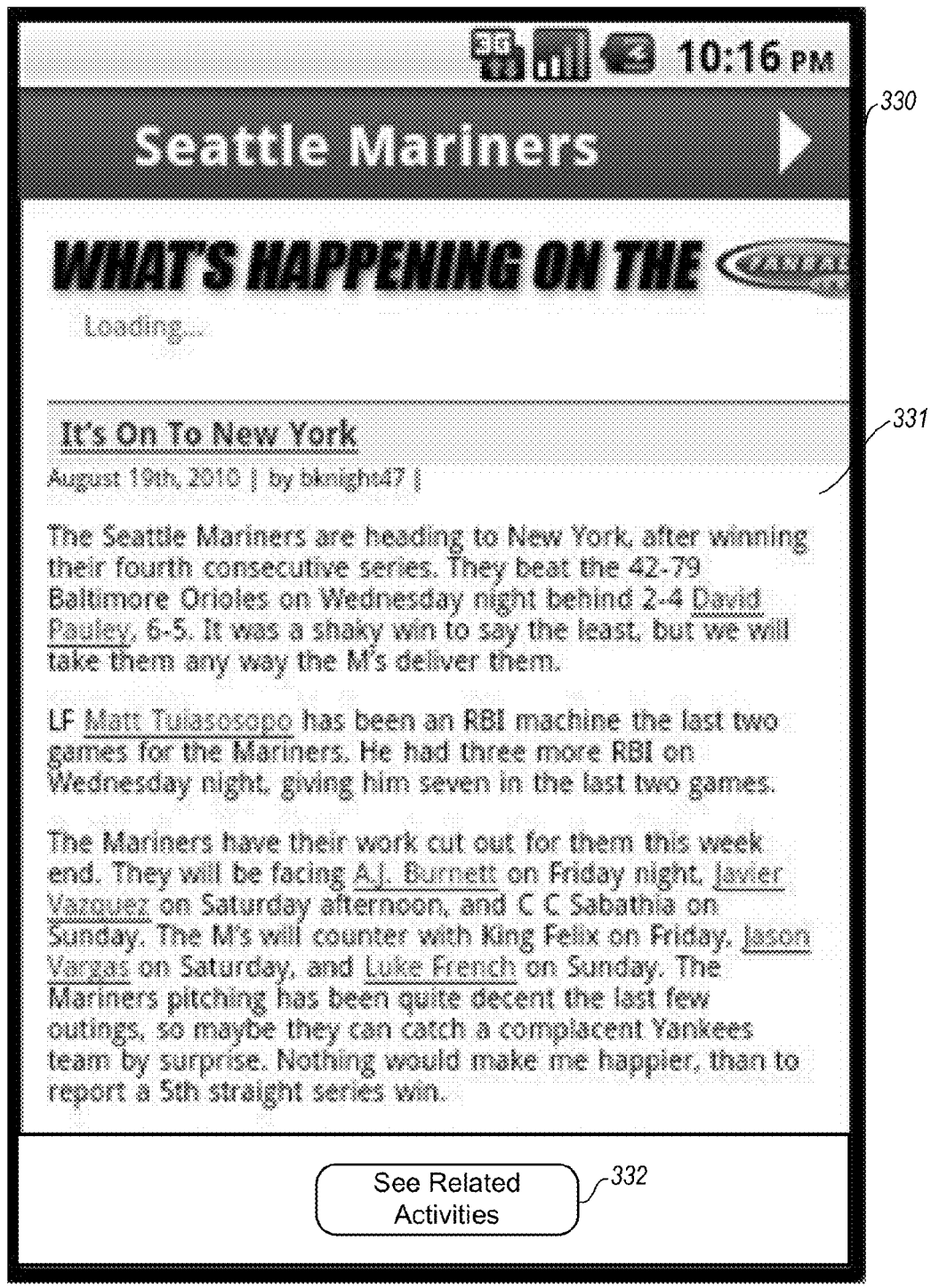

FIG. 3D illustrates a content screen 330 of the content recommendation application. The illustrated content screen 330 is displayed in response to a user selection of content snippet 321 shown in FIG. 3C. The screen 330 displays a Web page 331 that discusses current news regarding the Seattle Mariners. Note that the illustrated Web page 331 references various entities, including the Seattle Mariners, New York, the Baltimore Orioles, and various players (e.g., David Pauley, Jason Vargas). As discussed above, the ARS processes the text on the Web page 331 to identify these (and other entities) as well as associated facets/categories (e.g., baseball team, city, sports league). The screen 330 further includes a control 332 that can be selected by a user to obtain activity recommendations with respect to the Web page 331, as described next.

FIG. 3E illustrates an activity recommendation screen 340 of the content recommendation application. The activity recommendation screen 340 is displayed in response to user selection of control 324 (FIG. 3C) and/or control 332 (FIG. 3D). The screen 340 includes a content snippet 341 that provides information about the content item for which activities are being recommended. The screen 340 further includes a related applications section 342, a related Websites section 343, and a control 344 for obtaining additional recommended activities. The sections 342 and 343 include controls (e.g., buttons) that can be selected to obtain or otherwise access corresponding mobile applications or Websites. For example, upon selecting control 345, the user will be provided with the option to install a Major League Baseball mobile application for obtaining scores, statistics, and other information. Note that such an application is included as a recommended application even though the content item shown in the snippet 341 may not necessarily directly reference the entity Major League Baseball. As discussed above, the content item discusses the entity Seattle Mariners, which the ARS can determine is a member of Major League Baseball, based on a semantic network or other structure for representing knowledge maintained by the ARS or some other system.

Some embodiments recommend activities or perform other functions by taking into account information about what applications are already installed or used by a mobile device. In particular, the function(s) performed when a user selects one of the controls in sections 342 and 343 may be based at least in part on the mobile applications that are or are not already installed on the mobile device. For example, if a mobile device already includes a recommended mobile application, the application may be launched directly. On some platforms, this may be accomplished by way of a registered URL scheme, such as comgoogleearth: (e.g., for Google Earth), fb: (e.g., for Facebook), skpe: (e.g., for Skype). Parameters or other data obtained from the corresponding content item may also be passed along to facilitate a seamless application launch, including telephone numbers, location information, personal information, or the like. On the other hand, if the mobile device does not already have a recommended application installed, the user may be provided with the option to install the application, or the application may be installed automatically, possibly determined by user preferences or other settings.

Figure 3F:

FIGS. 3F-3G illustrate activity recommendation integrated as a widget on a Web page. FIG. 3F illustrates a Web browser screen 350. The screen 350 is displaying a Web page 351 that discusses drinking water as part of a weight loss regimen. The Web page 351 further includes a control (e.g., an icon) 352 that can be selected by a user to execute a remotely-hosted recommendation widget that can provide activity recommendations with respect to the illustrated Web page 351, as described next.

FIG. 3G illustrates an activity recommendation screen 360 displayed by a remotely-hosted Web-based recommendation widget. In the illustrated embodiment, the control 352 of FIG. 3F links to a code module (e.g., a JavaScript module) that is downloaded to, and executed by, the Web browser of the mobile device to present the activity recommendation screen 360. In this manner, activity recommendations can be provided even though the user has not installed any specific activity recommendation software on his mobile device. In other embodiments, other types of user interface components may be presented by the recommendation widget, including popups, menus, or the like. The screen 360 is similar to the activity recommendation screen 340 described with respect to FIG. 3E, except that screen 360 includes recommendations tailored to the content of Web page 351. In particular, screen 360 includes recommended activities with respect to dieting, personal health, and medical research, which are all entities that are directly or indirectly referenced by the Web page 351.

Figure 3H:
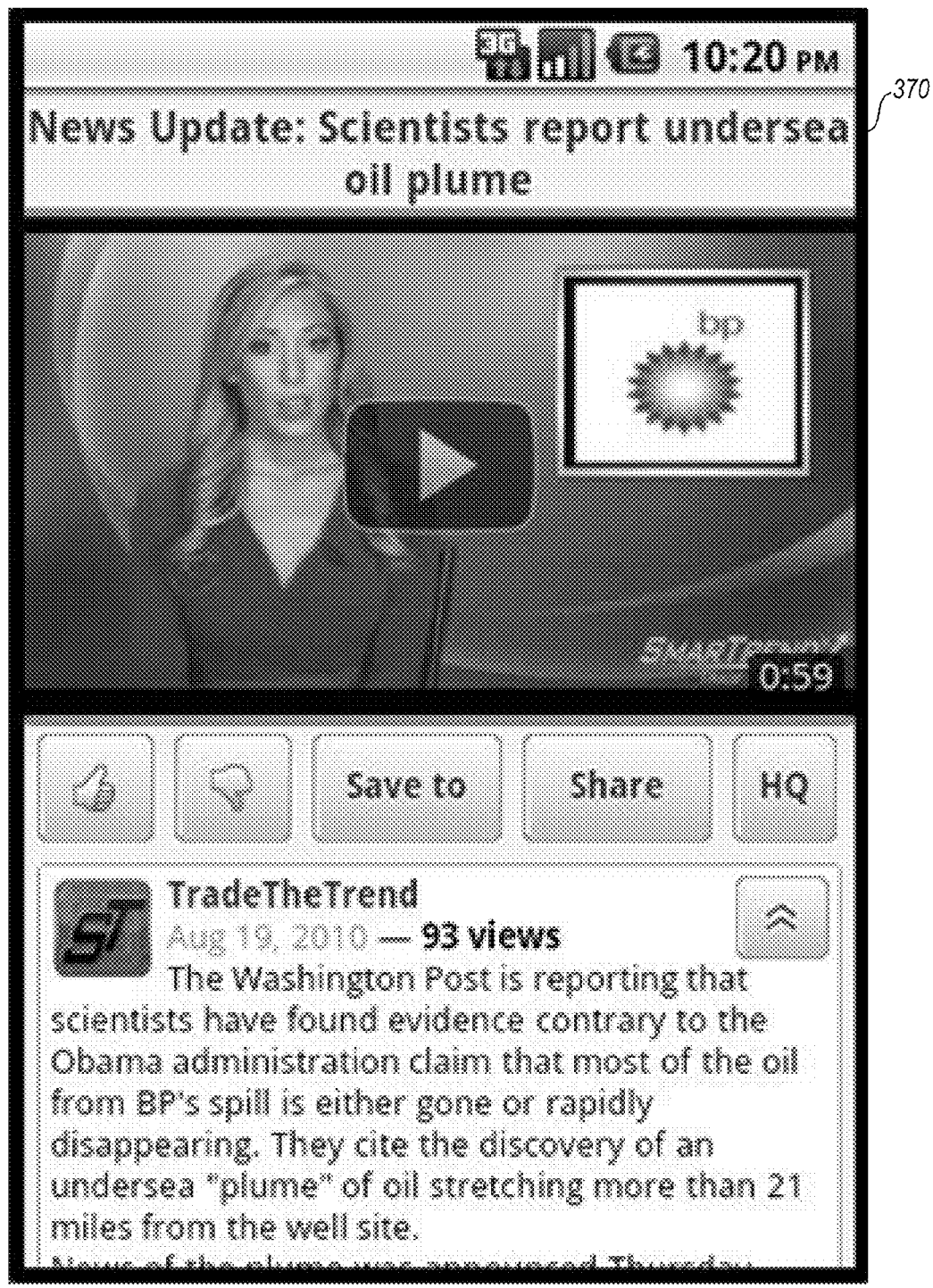
Figure 3I:
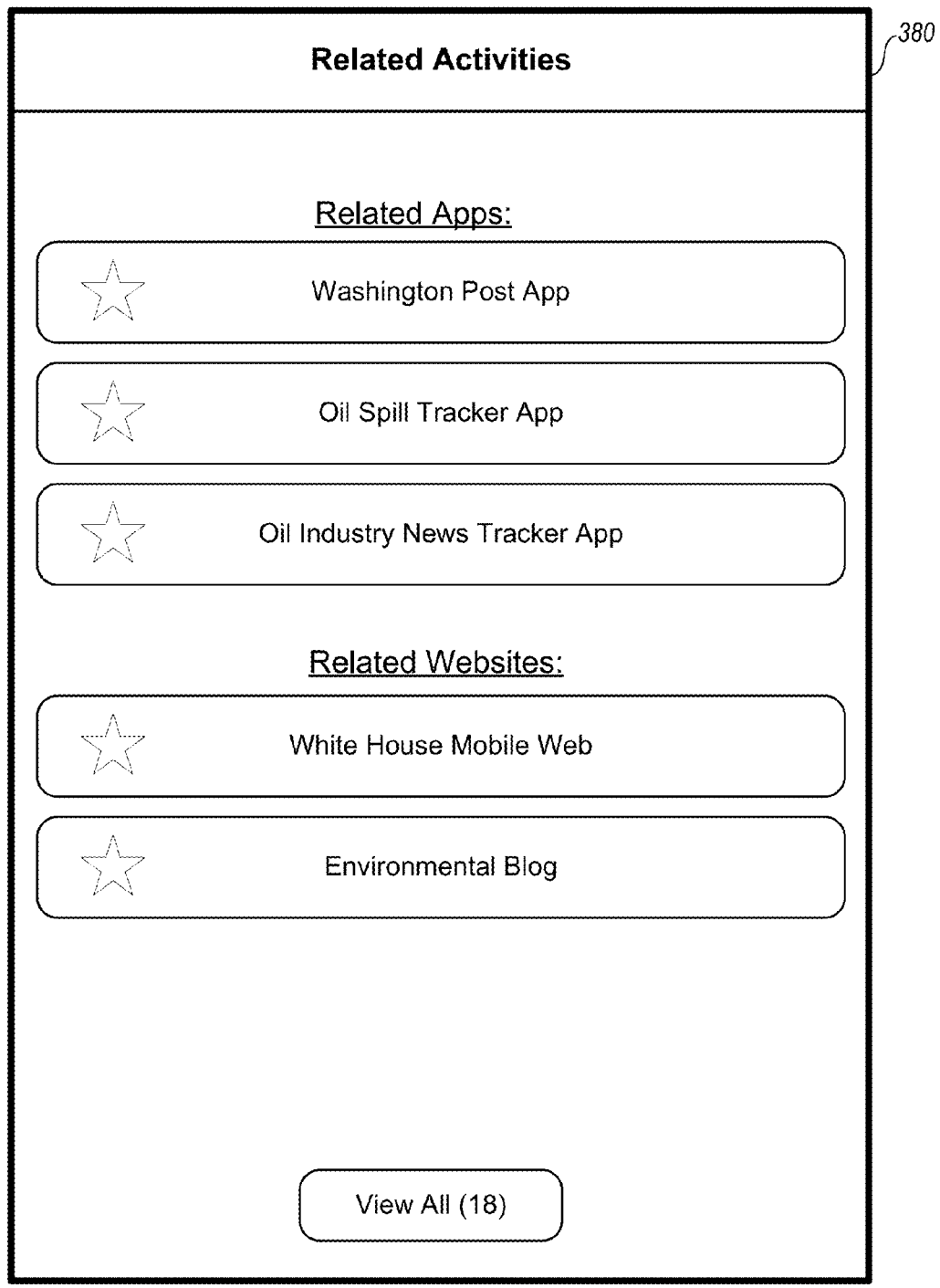

FIGS. 3H-3I illustrate activity recommendation provided as part of a mobile device operating system and not integrated into any particular application executing on a mobile device. In the illustrated example, an activity recommendation module executes as a service or other component managed by the operating system of a mobile device. In such an embodiment, activity recommendation need not necessarily be integrated into any particular application, but is rather provided by the mobile device itself. The activity recommendation module may execute concurrently with other mobile applications, monitoring the content accessed by those applications, and determining activity recommendations.

FIG. 3H shows a video player application 370. When a user operates the video player application 370 to view a video stream, the activity recommendation module may access the stream and related data (e.g., summary, title, closed captions) and determine recommended activities based on semantic information contained therein. In this example, when the user selects a particular control (e.g., hardware control 104 of FIG. 1, a software menu item), the mobile device presents the determined recommended activities, as described next.

FIG. 3I shows illustrates an activity recommendation screen 380 displayed by an activity recommender module of a mobile device in response to a user input. The screen 380 is similar to the activity recommendation screen 340 described with respect to FIG. 3E, except that screen 380 includes recommendations tailored to the video and associated content displayed in the video player application 370. In particular, screen 380 includes recommended activities with respect to the Washington Post newspaper, oil spills, the White House, and the environment, which are all entities or categories that are directly or indirectly referenced by the video and associated content of the video player application 370.

Although the activity recommendation techniques of FIGS. 3A-3I have been described primarily with reference to Web-based and mobile technologies, the described techniques are equally applicable in other contexts. For example, activity recommendation may be performed in the desktop computing context, such that plug-ins, add-ons, or applications may be recommended based on context information associated with the operation of a desktop computer, such as Web pages accessed by a user.

Figure 4:
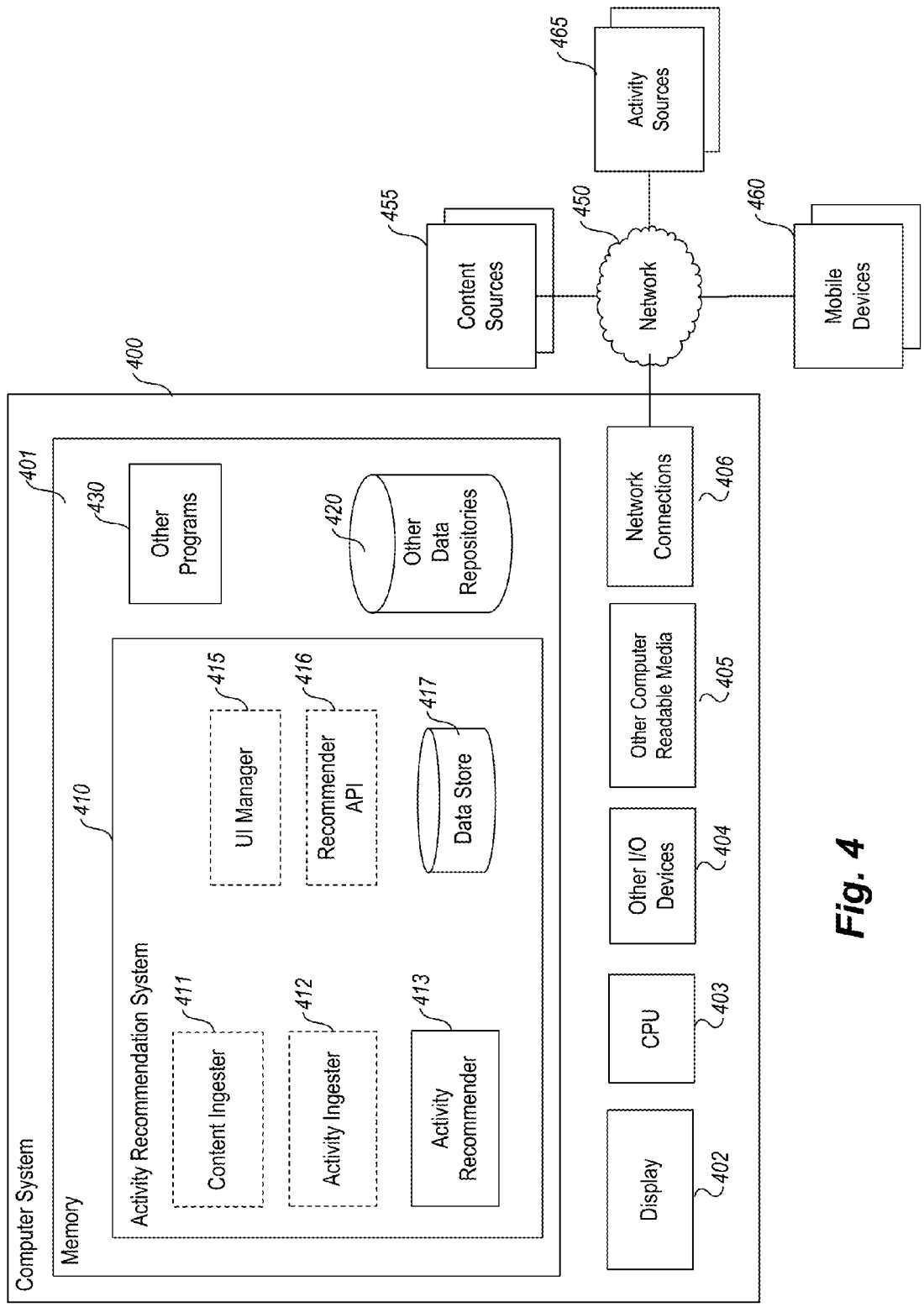
FIG. 4 is an example block diagram of an example computing system for implementing an activity recommendation system according to an example embodiment.

FIG. 4 is an example block diagram of an example computing system for implementing an activity recommendation system according to an example embodiment. In particular, FIG. 4 shows a computing system 400 that may be utilized to implement an activity recommendation system 410.

Note that one or more general purpose or special purpose computing systems/devices may be used to implement the activity recommendation system 410. In addition, the computing system 400 may comprise one or more distinct computing systems/devices and may span distributed locations. Furthermore, each block shown may represent one or more such blocks as appropriate to a specific embodiment or may be combined with other blocks. Also, the activity recommendation system 410 may be implemented in software, hardware, firmware, or in some combination to achieve the capabilities described herein.

In the embodiment shown, computing system 400 comprises a computer memory ("memory") 401, a display 402, one or more Central Processing Units ("CPU") 404, Input/Output devices 404 (e.g., keyboard, mouse, CRT or LCD display, and the like), other computer-readable media 405, and network connections 406. The activity recommendation system 410 is shown residing in memory 401. In other embodiments, some portion of the contents, some or all of the components of the activity recommendation system 410 may be stored on and/or transmitted over the other computer-readable media 405. The components of the activity recommendation system 410 preferably execute on one or more CPUs 403 and recommend activities based on mobile device context, as described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

In a typical embodiment, the activity recommendation system 410 includes a content ingester 411, an activity ingester 412, an activity recommender 413, a user interface manager 415, a recommender application program interface ("API") 416, and a data store 417. The content ingester 411, activity ingester 412, user interface manager 415, and recommender API 416 are drawn in dashed lines to emphasize that in other embodiments, functions performed by one or more of these components may be performed externally to the activity recommendation system 410. For example, a separate mobile application search and discovery system may host the content ingester 411, activity ingester 412, and at least some of the data store 417.

The content ingester 411 performs functions such as those described with reference to the content ingester 211 of FIG. 2. The ingester 411 obtains content items, such as Web pages, Blog postings, videos, audio files, and the like from various content sources 455 via network 450, and stores semantic information about the obtained content items (e.g., entities and relationships between them) in the data store 417, for use by other components, such as the activity ingester 412 and/or the activity recommender 413.

The activity ingester 412 performs functions such as those described with reference to the activity ingester 212 of FIG. 2. The activity ingester 412 obtains and processes information about activities, such as mobile applications and/or Websites. The activity ingester stores semantic information about ingested mobile applications and Websites in the data store 417, for use by other components such as the activity recommender 413.

The UI manager 415 provides a view and a controller that facilitate user interaction with the activity recommendation system 410 and its various components. For example, the UI manager 415 may provide interactive access to the activity recommendation system 410, such that users can search for applications related to particular entities or categories. In some embodiments, access to the functionality of the UI manager 415 may be provided via a Web server, possibly executing as one of the other programs 430. In such embodiments, a user operating a Web browser executing on one of the client devices 460 can interact with the activity recommendation system 410 via the UI manager 415. For example, a user may manually submit a search for mobile applications that are about or related to a specified entity.

The activity recommender 413 performs functions such as those described with reference to the activity recommender 213 of FIG. 2. The recommender 413 receives from one of the mobile devices 460, possibly via the UI manager 415 or the API 416, an indication of a content item. In response, the recommender 413 determines activities that are related to the indicated content item, and transmits the determined activities to the mobile device 460. The mobile device itself may have client logic that interacts with the activity recommender 413, such as a portion of a mobile application executing on the mobile device (e.g., the domain-based content recommender of FIGS. 3B-3E), a network-accessible code module that is downloaded to and executed by the mobile device in the context of some other application (e.g., the Web browser of FIGS. 3F-3G), a portion or service of the operating system of the mobile device (e.g., as discussed with respect to the video player of FIGS. 3H-3I), or the like.

The API 416 provides programmatic access to one or more functions of the activity recommendation system 410. For example, the API 416 may provide a programmatic interface to one or more functions of the activity recommendation system 410 that may be invoked by one of the other programs 430 or some other module. In this manner, the API 416 facilitates the development of third-party software, such as user interfaces, plug-ins, news feeds, adapters (e.g., for integrating functions of the activity recommendation system 410 into Web applications), and the like. In addition, the API 416 may be in at least some embodiments invoked or otherwise accessed via remote entities, such as code executing on one of the mobile devices 460, to access various functions of the activity recommendation system 410. For example, an application on a mobile device may obtain recommended activities for a specified content item via the API 416. As another example, one of the activity sources 465 may push information about mobile applications to the activity recommendation system 410 via the API 416. The API 416 may also be configured to provide recommendation widgets (e.g., code modules) that can be integrated into third-party applications and that are configured to interact with the activity recommendation system 410 to make at least some of the described functionality available within the context of other applications.

The data store 417 is used by the other modules of the activity recommendation system 410 to store and/or communicate information. As discussed above, components 411-416 use the data store 417 to record various types of information, including semantic information about content and/or activities, such as entities, categories, and relationships. Although the components 411-416 are described as communicating primarily through the data store 417, other communication mechanisms are contemplated, including message passing, function calls, pipes, sockets, shared memory, and the like.

The activity recommendation system 410 interacts via the network 450 with content sources 455, activity sources 465, and mobile devices 460. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The mobile devices 460 include notebook computers, mobile phones, smart phones, tablet computers, personal digital assistants, and the like.

In an example embodiment, components/modules of the activity recommendation system 410 are implemented using standard programming techniques. For example, the activity recommendation system 410 may be implemented as a "native" executable running on the CPU 403, along with one or more static or dynamic libraries. In other embodiments, the activity recommendation system 410 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the activity recommendation system 410, such as in the data store 417, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 417 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the activity recommendation system 410 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and/or data structures may be stored as non-transitory content on one or more tangible computer-readable mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 5:
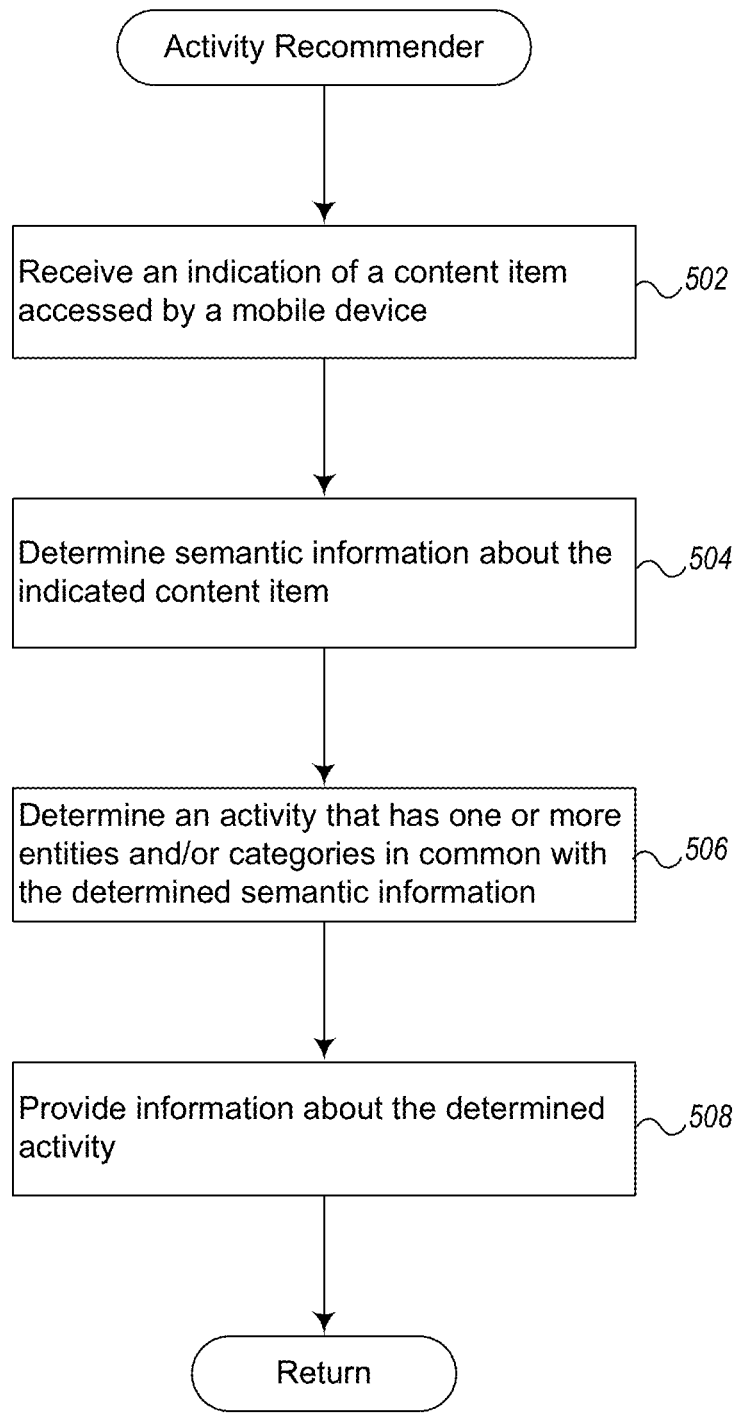
FIG. 5 is an example flow diagram of an activity recommendation process performed by an example embodiment.

FIG. 5 is an example flow diagram of an activity recommendation process performed by an example embodiment. In particular, FIG. 5 illustrates a process that may be implemented by, for example, one or more elements of the activity recommendation system 200, such as the activity recommender 213, described with reference to FIG. 2. In other embodiments, the process may be performed primarily on a mobile device, possibly in cooperation with a remote activity recommendation system 200. The process recommends activities based on content items accessed via a mobile device.

The illustrated process begins at block 502, where it receives an indication of a content item accessed by a mobile device. The content item may be a Web page that is being accessed by the mobile device, such as via a Web browser executing on the device.

At block 504, the process determines semantic information about the indicated content item. Determining semantic information may include processing the content item to identify entities and/or categories referenced by or related to the content item. In other embodiments, the content item may have been previously processed, such that determining the semantic information may include accessing a data repository to look up the semantic information associated with the content item.

At block 506, the process determines an activity that has one or more entities and/or categories in common with the determined semantic information. Determining an activity may include determining one or more mobile applications and/or Websites that have entities and/or categories that match (e.g., are the same as or similar to) one or more entities or categories of the content item. This may include processing information about one or more mobile applications and/or Websites to determine entities and/or categories related thereto. In some embodiments, this operation may have been previously performed, such that the entities/categories can be determined by way of a look up in a table or other data repository.

At block 508, the process provides information about the determined activity. Providing information may include transmitting the information to the mobile device for display thereon, such as by a recommendation component executing on the mobile device. In other embodiments, such as when the illustrated process is performed on the mobile device, providing information may include displaying the information.

After block 508, the process returns. In other embodiments the process may instead proceed to one of blocks 502-506 to make further recommendations.

Some embodiments perform one or more operations/aspects in addition to, or instead of, the ones described with reference to the process of FIG. 5. For example, in one embodiment, the process also or instead uses other context information, such as user preferences, user location, operational state data of the hardware/software of the mobile device, or the like.

Figure 6:
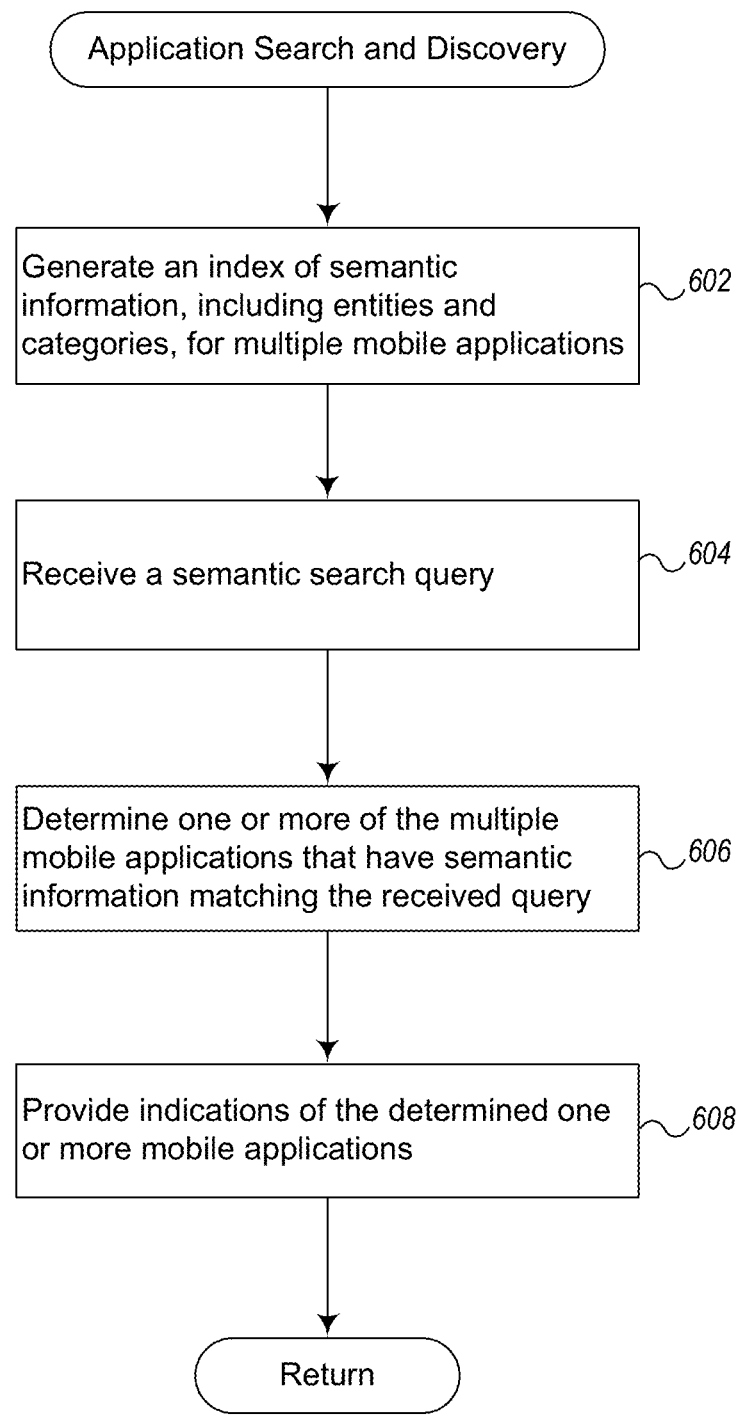
FIG. 6 is an example flow diagram of a mobile application search and discovery process performed by an example embodiment.

FIG. 6 is an example flow diagram of a mobile application search and discovery process performed by an example embodiment. In particular, FIG. 6 illustrates a process that may be implemented by, for example, one or more elements of the activity recommendation system 200, such as the activity ingester 212 and the data store 217, described with reference to FIG. 2. The process responds to semantic search queries for mobile applications.

The process begins at block 602 where it generates an index of semantic information, including entities and categories, for multiple mobile applications. Generating the index may include crawling or otherwise processing information about mobile applications and/or Websites in order to determine semantic information, including entities and/or categories that are related to the mobile applications. The processed information about the mobile applications may be represented as textual data such as titles, summaries, descriptions, help files, reviews, instruction manuals, and the like. The information about the mobile applications may be obtained from various sources, including "app stores" (e.g., Android Market, Apple App Store), mobile Websites (e.g., Fandango movie tickets mobile Website), third-party Websites (e.g., mobile application review sites, blogs), and the like.

The semantic information determined as part of the indexing process may include entities and categories/facets that describe or are otherwise related to the mobile applications. For example, a Seattle Mariners mobile application may be associated with entities such as Seattle and Seattle Mariners, and categories such as baseball_team and sports_team. The mobile applications are then associated (e.g., tagged) with their corresponding determined semantic information, and such associations are stored in a data structure (e.g., hash table, index, tree), such that mobile applications having a particular entity or category can be efficiently identified.

At block 604, the process receives a semantic search query. The semantic search query specifies at least one entity (e.g., Seattle) or category (e.g., baseball_team). The semantic search query may support various types of searches, including searches for applications about a particular entity (e.g., mobile applications about the Seattle Mariners); searches for applications about a particular category, genre, or group of entities (e.g., mobile applications about baseball teams, mobile applications about heavy metal music); searches for applications that are related to particular entities or categories (e.g., mobile applications about movies starring a specified actor).

At block 606, the process determines one or more of the multiple mobile applications that have semantic information matching the received query. Determining the one or more mobile applications includes accessing the index or other data structure generated at block 602 to determine which mobile applications are associated with the semantic information (e.g., entities and/or categories) specified as part of the received search query.

At block 608, the process provides indications of the determined one or more mobile applications. Providing the indications may include transmitting, presenting, storing, or displaying the indications. After block 608, the process returns. In other embodiments the process may instead proceed to one of blocks 602-606 to index additional applications and/or handle additional search requests.

Some embodiments perform one or more operations/aspects in addition to, or instead of, the ones described with reference to the process of FIG. 6. For example, in one embodiment, the process orders or ranks the determined one or more applications, based on various factors, such as importance, relevance, salience of the entity or category of the search request to each of the one or more applications; popularity of each of the applications (e.g., based on number of downloads or user ratings/feedback); and the like.

Example Entity Types

The following Table defines several example entity types in an example embodiment. Other embodiments may incorporate different types.

TABLE 1

Person
Organization
Location
Concept
Event
Product
Condition
Organism
Substance

Example Facets

The following Table defines several example facets in an example embodiment. Other embodiments may incorporate different facets.

TABLE 2

PERSON actor Evri/Person/Entertainment/Actor
PERSON animator Evri/Person/Entertainment/Animator
PERSON cinematographer Evri/Person/Entertainment/Cinematographer
PERSON comedian Evri/Person/Entertainment/Comedian
PERSON fashion_designer Evri/Person/Entertainment/Fashion_Designer
PERSON musician Evri/Person/Entertainment/Musician
PERSON composer Evri/Person/Entertainment/Musician/Composer
PERSON producer Evri/Person/Entertainment/Producer
PERSON director Evri/Person/Entertainment/Director
PERSON radio_personality Evri/Person/Entertainment/Radio_Personality
PERSON television_personality Evri/Person/Entertainment/Television_Personality
PERSON author Evri/Person/Entertainment/Author
PERSON model Evri/Person/Entertainment/Model
PERSON screenwriter Evri/Person/Entertainment/Screenwriter
PERSON playwright Evri/Person/Entertainment/Playwright
PERSON conductor Evri/Person/Entertainment/Conductor
PRODUCT film Evri/Product/Entertainment/Movie TABLE 2-continued

```
PRODUCT television_show Evri/Product/Entertainment/Television_Show
PRODUCT album Evri/Product/Entertainment/Album
PRODUCT musical Evri/Product/Entertainment/Musical
PRODUCT book Evri/Product/Entertainment/Book
PRODUCT newspaper Evri/Product/Publication
PERSON politician Evri/Person/Politics/Politician
PERSON cabinet_member Evri/Person/Politics/Cabinet_Member
PERSON government_person Evri/Person/Politics/Government_Person
PERSON political_party_leader Evri/Person/Politics/Political_Party_Leader
PERSON judge Evri/Person/Politics/Judge
PERSON country_leader Evri/Person/Politics/Politician/World_Leader
PERSON joint_chiefs_of_staff
Evri/Person/Politics/Politician/Joint_Chiefs_of_Staff
PERSON white_house_staff Evri/Person/Politics/White_House_Staff
PERSON activist Evri/Person/Politics/Activist
PERSON lobbyist Evri/Person/Politics/Lobbyist
PERSON ambassador Evri/Person/Politics/Ambassador
PERSON analyst Evri/Person/Analyst
PERSON journalist Evri/Person/Journalist
PERSON blogger Evri/Person/Blogger
ORGANIZATION band Evri/Organization/Entertainment/Band
ORGANIZATION political_party Evri/Organization/Politics/Political_Party
ORGANIZATION advocacy_group Evri/Organization/Politics/Advocacy_Group
EVENT film_award_ceremony Evri/Event/Entertainment/Film_Award_Ceremony
EVENT music_award_ceremony Evri/Event/Entertainment/Music_Award_Ceremony
EVENT television_award_ceremony Evri/Event/Entertainment/Television_Award_Ceremony
EVENT court_case Evri/Event/Politics/Court_Case
ORGANIZATION television_network
Evri/Organization/Entertainment/Company/Television_Network
ORGANIZATION music_production_company
Evri/Organization/Entertainment/Company/Music_Production_Company
ORGANIZATION film_production_company
Evri/Organization/Entertainment/Company/Film_Production_Company
LOCATION congressional_district Evri/Location/Politics/Congressional_District
LOCATION military_base Evri/Location/Politics/Military_Base
ORGANIZATION congressional_committee Evri/Organization/Politics/Congressional_Committee
ORGANIZATION international_organization
Evri/Organization/Politics/International_Organization
ORGANIZATION government_agency Evri/Organization/Politics/Government_Agency
ORGANIZATION armed_force Evri/Organization/Politics/Armed_Force
ORGANIZATION terrorist_organization
Evri/Organization/Politics/Terrorist_Organization
ORGANIZATION us_court Evri/Organization/Politics/US_Court
ORGANIZATION cabinet_department Evri/Organization/Politics/Cabinet_Department
LOCATION continent Evri/Location/Continent
LOCATION geographic_region Evri/Location/Geographic_Region
LOCATION country Evri/Location/Country
LOCATION province Evri/Location/Province
LOCATION state Evri/Location/State
LOCATION city Evri/Location/City
LOCATION us_city Evri/Location/City
LOCATION neighborhood Evri/Location/Neighborhood
LOCATION building Evri/Location/Structure/Building
LOCATION island Evri/Location/Island
LOCATION mountain Evri/Location/Mountain
LOCATION body_of_water Evri/Location/Body_of_Water
ORGANIZATION media_companyEvri/Organization/Entertainment/Company/Media_Company
ORGANIZATION haute_couture_house
Evri/Organization/Entertainment/Company/Haute_Couture_House
ORGANIZATION publishing_company
Evri/Organization/Entertainment/Company/Publishing_Company
ORGANIZATION entertainment_company Evri/Organization/Entertainment/Company
CONCEPT fictional_character Evri/Concept/Entertainment/Fictional_Character
PERSON military_leader Evri/Person/Politics/Military_Leader
PERSON military_person Evri/Person/Politics/Military_Person
EVENT military_conflict Evri/Event/Politics/Military_Conflict
PERSON terrorist Evri/Person/Politics/Terrorist
PERSON criminal Evri/Person/Criminal
PERSON explorer Evri/Person/Explorer
PERSON inventor Evri/Person/Technology/Inventor
PERSON lawyer Evri/Person/Lawyer
PERSON artist Evri/Person/Artist
PERSON painter Evri/Person/Artist/Painter
PERSON revolutionary Evri/Person/Revolutionary
PERSON spiritual_leader Evri/Person/Spiritual_Leader
PERSON philosopher Evri/Person/Philosopher
PERSON anthropologist Evri/Person/Anthropologist
PERSON architect Evri/Person/Architect
PERSON historian Evri/Person/Historian
PERSON editor Evri/Person/Editor
```

TABLE 2-continued

```
PERSON astronaut Evri/Person/Astronaut
PERSON photographer Evri/Person/Photographer
PERSON scientist Evri/Person/Technology/Scientist
PERSON economist Evri/Person/Economist
PERSON technology_person Evri/Person/Technology/Technology_Person
PERSON business_person Evri/Person/Business/Business_Person
PERSON stock_trader Evri/Person/Business/Business_Person/Stock_Trader
PERSON first_lady Evri/Person/Politics/First_Lady
ORGANIZATION us_state_legislature
  Evri/Organization/Politics/Legislative_Body/State_Legislature
ORGANIZATION legislative_body Evri/Organization/Politics/Legislative_Body
ORGANIZATION executive_body Evri/Organization/Politics/Executive_Body
PERSON team_owner Evri/Person/Sports/Team_Owner
PERSON sports_announcer Evri/Person/Sports/Sports_Announcer
PERSON sports_executive Evri/Person/Sports/Sports_Executive
PERSON olympic_medalist Evri/Person/Sports/Olympic_Medalist
PERSON athlete Evri/Person/Sports/Athlete
PERSON coach Evri/Person/Sports/Coach
PERSON sports_official Evri/Person/Sports/Sports_Official
PERSON motorcycle_driver Evri/Person/Sports/Athlete/Motorcycle_Rider
PERSON race_car_driver Evri/Person/Sports/Athlete/Race_car_Driver
ORGANIZATION auto_racing_team Evri/Organization/Sports/Auto_Racing_Team
PERSON baseball_player Evri/Person/Sports/Athlete/Baseball_Player
ORGANIZATION baseball_team Evri/Organization/Sports/Baseball_Team
PERSON basketball_player Evri/Person/Sports/Athlete/Basketball_Player
ORGANIZATION basketball_team Evri/Organization/Sports/Basketball_Team
PERSON football_player Evri/Person/Sports/Athlete/Football_Player
ORGANIZATION football_team Evri/Organization/Sports/Football_Team
PERSON hockey_player Evri/Person/Sports/Athlete/Hockey_Player
ORGANIZATION hockey_team Evri/Organization/Sports/Hockey_Team
PERSON soccer_player Evri/Person/Sports/Athlete/Soccer_Player
ORGANIZATION soccer_team Evri/Organization/Sports/Soccer_Team
ORGANIZATION sports_league Evri/Organization/Sports/Sports_League
PERSON cricketer Evri/Person/Sports/Athlete/Cricketer
ORGANIZATION cricket_team Evri/Organization/Sports/Cricket_Team
PERSON cyclist Evri/Person/Sports/Athlete/Cyclist
ORGANIZATION cycling_team Evri/Organization/Sports/Cycling_Team
PERSON volleyball_player Evri/Person/Sports/Athlete/Volleyball_Player
ORGANIZATION volleyball_team Evri/Organization/Sports/Volleyball_Team
PERSON rugby_player Evri/Person/Sports/Athlete/Rugby_Player
ORGANIZATION rugby_team Evri/Organization/Sports/Rugby_Team
PERSON boxer Evri/Person/Sports/Athlete/Boxer
PERSON diver Evri/Person/Sports/Athlete/Diver
PERSON golfer Evri/Person/Sports/Athlete/Golfer
PERSON gymnast Evri/Person/Sports/Athlete/Gymnast
PERSON figure_skater Evri/Person/Sports/Athlete/Figure_Skater
PERSON horse_racing_jockey Evri/Person/Sports/Athlete/Horse_Racing_Jockey
PERSON lacrosse_player Evri/Person/Sports/Athlete/Lacrosse_Player
ORGANIZATION lacrosse_team Evri/Organization/Sports/Lacrosse_Team
PERSON rower Evri/Person/Sports/Athlete/Rower
PERSON swimmer Evri/Person/Sports/Athlete/Swimmer
PERSON tennis_player Evri/Person/Sports/Athlete/Tennis_Player
PERSON track_and_field_athlete Evri/Person/Sports/Athlete/Track_and_Field_Athlete
PERSON wrestler Evri/Person/Sports/Athlete/Wrestler
PERSON triathlete Evri/Person/Sports/Athlete/Triathlete
EVENT sports_competition Evri/Event/Sports/Sports_Event/Sporting_Competition
EVENT sports_event Evri/Event/Sports/Sports_Event
EVENT olympic_sport Evri/Event/Sports/Olympic_Sports
EVENT election Evri/Event/Politics/Election
LOCATION sports_venue Evri/Location/Sports/Sports_Venue
ORGANIZATION sports_division Evri/Organization/Sports/Sports_Division
ORGANIZATION sports_event_promotion_company
  Evri/Organization/Sports/Sports_Event_Promotion_Company
ORGANIZATION sports_organization Evri/Organization/Sports/Sports_Organization
ORGANIZATION company Evri/Organization/Business/Company
ORGANIZATION news_agency Evri/Organization/Business/Company/News_Agency
PRODUCT cell_phone Evri/Product/Technology/Cell_Phone
PRODUCT computer Evri/Product/Technology/Computer
PRODUCT software Evri/Product/Technology/Software
PRODUCT video_game Evri/Product/Technology/Software/Video_Game
PRODUCT video_game_console Evri/Product/Technology/Video_Game_Console
PRODUCT media_player Evri/Product/Technology/Media_player
ORGANIZATION website Evri/Organization/Technology/Website
ORGANIZATION technology_company Evri/Organization/Technology/Company
PRODUCT magazine Evri/Product/Publication
ORGANIZATION financial_services_company
  Evri/Organization/Business/Company/Financial_Services_Company
ORGANIZATION radio_network Evri/Organization/Entertainment/Company/Radio_Network
ORGANIZATION futures_exchange Evri/Organization/Business/Futures_Exchange
ORGANIZATION stock_exchange Evri/Organization/Business/Stock_Exchange
```

TABLE 2-continued

```
ORGANIZATION government_sponsored_enterprise
Evri/Organization/Politics/Government_Sponsored_Enterprise
ORGANIZATION political_organization Evri/Organization/Politics/Political_organization
ORGANIZATION labor_union Evri/Organization/Politics/Labor_Union
ORGANIZATION nonprofit_corporation
Evri/Organization/Business/Company/Nonprofit_Corporation
ORGANIZATION nonprofit_organization Evri/Organization/Nonprofit_Organization
ORGANIZATION national_laboratory Evri/Organization/Politics/National_Laboratory
ORGANIZATION unified_combatant_commands
Evri/Organization/Politics/Unified_Combatant_Commands
ORGANIZATION research_institute Evri/Organization/Research_Institute
CONCEPT stock_market_index Evri/Concept/Business/Stock_Market_Index
PERSON business_executive Evri/Person/Business/Business_Person/Business_Executive
PERSON corporate_director Evri/Person/Business/Business_Person/Corporate_Director
PERSON banker Evri/Person/Business/Business_Person/Banker
PERSON publisher Evri/Person/Business/Business_Person/Publisher
PERSON us_politician Evri/Person/Politics/U.S._Politician
PERSON nobel_laureate Evri/Person/Nobel_Laureate
PERSON chemist Evri/Person/Chemist
PERSON physicist Evri/Person/Physicist
ORGANIZATION business_organization Evri/Organization/Business/Business_Organization
ORGANIZATION consumer_organization Evri/Organization/Business/Consumer_Organization
ORGANIZATION professional_association Evri/Organization/Business/Professional_Association
PERSON investor Evri/Person/Business/Business_Person/Investor
PERSON financier Evri/Person/Business/Business_Person/Financier
PERSON money_manager Evri/Person/Business/Business_Person/Money_Manager
ORGANIZATION aerospace_company
Evri/Organization/Business/Company/Aerospace_Company
ORGANIZATION advertising_agency
Evri/Organization/Business/Company/Advertising_Company
ORGANIZATION agriculture_company
Evri/Organization/Business/Company/Agriculture_Company
ORGANIZATION airline Evri/Organization/Business/Company/Airline
ORGANIZATION architecture_firm Evri/Organization/Business/Company/Architecture_Firm
ORGANIZATION automotive_company
Evri/Organization/Business/Company/Automotive_Company
ORGANIZATION chemical_company Evri/Organization/Business/Company/Chemical_Company
ORGANIZATION clothing_company Evri/Organization/Business/Company/Clothing_Company
ORGANIZATION consulting_company
Evri/Organization/Business/Company/Consulting_Company
ORGANIZATION cosmetics_company
Evri/Organization/Business/Company/Cosmetics_Company
ORGANIZATION defense_company Evri/Organization/Business/Company/Defense_Company
ORGANIZATION distribution_company
Evri/Organization/Business/Company/Distribution_Company
ORGANIZATION gaming_company Evri/Organization/Business/Company/Gaming_Company
ORGANIZATION electronics_company
Evri/Organization/Business/Company/Electronics_Company
ORGANIZATION energy_company Evri/Organization/Business/Company/Energy_Company
ORGANIZATION hospitality_company
Evri/Organization/Business/Company/Hospitality_Company
ORGANIZATION insurance_company Evri/Organization/Business/Company/Insurance_Company
ORGANIZATION law_firm Evri/Organization/Business/Company/Law_Firm
ORGANIZATION manufacturing_company
Evri/Organization/Business/Company/Manufacturing_Company
ORGANIZATION mining_company Evri/Organization/Business/Company/Mining_Company
ORGANIZATION pharmaceutical_company
Evri/Organization/Business/Company/Pharmaceutical_Company
ORGANIZATION railway_company Evri/Organization/Business/Company/Railway
ORGANIZATION real_estate_company
Evri/Organization/Business/Company/Real_Estate_Company
ORGANIZATION retailer Evri/Organization/Business/Company/Retailer
ORGANIZATION shipping_company Evri/Organization/Business/Company/Shipping_Company
ORGANIZATION software_company
Evri/Organization/Technology/Company/Software_Company
ORGANIZATION steel_company Evri/Organization/Business/Company/Steel_Company
ORGANIZATION telecommunications_company
Evri/Organization/Business/Company/Telecommunications_Company
ORGANIZATION utilities_company Evri/Organization/Business/Company/Utilities_Company
ORGANIZATION wholesaler Evri/Organization/Business/Company/Wholesaler
ORGANIZATION television_production_company
Evri/Organization/Entertainment/Company/Television_Production_Company
ORGANIZATION food_company Evri/Organization/Business/Company/Food_Company
ORGANIZATION beverage_company
Evri/Organization/Business/Company/Food_Company/Beverage_Company
ORGANIZATION restaurant Evri/Organization/Business/Company/Food_Company/Restaurant
ORGANIZATION winery
Evri/Organization/Business/Company/Food_Company/Beverage_Company
EVENT film_festival Evri/Event/Entertainment/Film_Festival
ORGANIZATION film_festival Evri/Event/Entertainment/Film_Festival
```

TABLE 2-continued

```
PRODUCT anime Evri/Product/Entertainment/Anime
PRODUCT aircraft Evri/Product/Aircraft
PRODUCT military_aircraft Evri/Product/Aircraft/Military_Aircraft
PRODUCT vehicle Evri/Product/Vehicle
PRODUCT ballet Evri/Product/Entertainment/Ballet
PRODUCT opera Evri/Product/Entertainment/Opera
PRODUCT painting Evri/Product/Entertainment/Painting
PRODUCT song Evri/Product/Entertainment/Single
EVENT technology_conference Evri/Event/Technology/Technology_Conference
CONCEPT legislation Evri/Concept/Politics/Legislation
CONCEPT treaty Evri/Concept/Politics/Treaty
ORGANIZATION trade_association Evri/Organization/Business/Trade_Association
ORGANIZATION technology_organization
Evri/Organization/Technology/Technology_Organization
ORGANIZATION educational_institution Evri/Organization/Educational_Institution
LOCATION museum Evri/Location/Structure/Building/Museum
LOCATION religious_building Evri/Location/Structure/Building/Religious_Building
PERSON astronomer Evri/Person/Astronomer
PERSON mathematician Evri/Person/Mathematician
PERSON academic Evri/Person/Academic
PERSON dancer Evri/Person/Entertainment/Dancer
PRODUCT play Evri/Product/Entertainment/Play
LOCATION botanical_garden Evri/Location/Botanical_Garden
LOCATION hospital Evri/Location/Health/Hospital
PERSON psychiatrist Evri/Person/Health/Psychiatrist
PERSON physician Evri/Person/Health/Physician
PERSON nurse Evri/Person/Health/Nurse
ORGANIZATION journalism_organization Evri/Organization/Journalism_Organization
ORGANIZATION healthcare_company
Evri/Organization/Business/Company/Healthcare_Company
ORGANIZATION religious_organization Evri/Organization/Religious_Organization
PERSON biologist Evri/Person/Scientist/Biologist
PERSON biochemist Evri/Person/Scientist/Biochemist
PERSON botanist Evri/Person/Scientist/Botanist
PERSON poet Evri/Person/Entertainment/Author/Poet
PERSON curler Evri/Person/Sports/Athlete/Curler
PERSON biathlete Evri/Person/Sports/Athlete/Biathlete
PERSON alpine_skier Evri/Person/Sports/Athlete/Alpine_Skier
PERSON cross-country_skier Evri/Person/Sports/Athlete/Cross-country_Skier
PERSON freestyle_skier Evri/Person/Sports/Athlete/Freestyle_Skier
PERSON luger Evri/Person/Sports/Athlete/Luger
PERSON nordic_combined_skier Evri/Person/Sports/Athlete/Nordic_Combined_Skier
PERSON speed_skater Evri/Person/Sports/Athlete/Speed_Skater
PERSON skeleton_racer Evri/Person/Sports/Athlete/Skeleton_Racer
PERSON ski_jumper Evri/Person/Sports/Athlete/Ski_Jumper
PERSON snowboarder Evri/Person/Sports/Athlete/Snowboarder
PERSON bobsledder Evri/Person/Sports/Athlete/Bobsledder
PERSON bodybuilder Evri/Person/Sports/Athlete/Bodybuilder
PERSON equestrian Evri/Person/Sports/Athlete/Equestrian
PERSON fencer Evri/Person/Sports/Athlete/Fencer
PERSON hurler Evri/Person/Sports/Athlete/Hurler
PERSON martial_artist Evri/Person/Sports/Athlete/Martial_Artist
PERSON canoer Evri/Person/Sports/Athlete/Canoer
LOCATION music_venue Evri/Location/Entertainment/Music_Venue
LOCATION aquarium Evri/Location/Aquarium
LOCATION cemetery Evri/Location/Cemetery
LOCATION national_park Evri/Location/National_Park
LOCATION volcano Evri/Location/Volcano
LOCATION zoo Evri/Location/Zoo
LOCATION structure Evri/Location/Structure
LOCATION airport Evri/Location/Structure/Airport
LOCATION bridge Evri/Location/Structure/Bridge
LOCATION hotel Evri/Location/Structure/Hotel
LOCATION palace Evri/Location/Structure/Palace
LOCATION monument Evri/Location/Structure/Monument
LOCATION street Evri/Location/Street
LOCATION amusement_park Evri/Location/Amusement_Park
LOCATION unitary_authority Evri/Location/Unitary_Authority
PRODUCT drug_brand Evri/Product/Health/Drug_Brand
PRODUCT weapon Evri/Product/Weapon
PRODUCT missile_system Evri/Product/Weapon/Missile_System
PRODUCT firearm Evri/Product/Weapon/Firearm
PRODUCT artillery Evri/Product/Weapon/Artillery
PRODUCT anti-aircraft_weapon Evri/Product/Weapon/Anti-aircraft_Weapon
PRODUCT anti-tank_weapon Evri/Product/Weapon/Anti-tank_Weapon
PRODUCT biological_weapon Evri/Product/Weapon/Biological_Weapon
PRODUCT chemical_weapon Evri/Product/Weapon/Chemical_Weapon
CHEMICAL chemical_weapon Evri/Product/Weapon/Chemical_Weapon
SUBSTANCE chemical_weapon Evri/Product/Weapon/Chemical_Weapon
PRODUCT explosive Evri/Product/Weapon/Explosive
```

TABLE 2-continued

```
PRODUCT weapons_launcher Evri/Product/Weapon/Weapons_Launcher
PERSON chess_player Evri/Person/Chess_Player
PERSON sculptor Evri/Person/Artist/Sculptor
PRODUCT game Evri/Product/Game
ORGANIZATION theater_company
Evri/Organization/Entertainment/Company/Theater_Company
PERSON badminton_player Evri/Person/Sports/Athlete/Badminton_Player
PRODUCT naval_ship Evri/Product/Watercraft/Naval_Ship
PRODUCT battleship Evri/Product/Watercraft/Naval_Ship/Battleship
PRODUCT cruiser Evri/Product/Watercraft/Naval_Ship/Cruiser
PRODUCT aircraft_carrier Evri/Product/Watercraft/Naval_Ship/Aircraft_Carrier
PRODUCT destroyer Evri/Product/Watercraft/Naval_Ship/Destroyer
PRODUCT frigate Evri/Product/Watercraft/Naval_Ship/Frigate
PRODUCT submarine Evri/Product/Watercraft/Naval_Ship/Submarine
PRODUCT cruise_ship Evri/Product/Watercraft/Cruise_Ship
PRODUCT yacht Evri/Product/Watercraft/Yacht
PRODUCT ocean_liner Evri/Product/Watercraft/Ocean_Liner
LOCATION county Evri/Location/County
PRODUCT symphony Evri/Product/Entertainment/Symphony
ORGANIZATION television_station
Evri/Organization/Entertainment/Company/Television_Station
ORGANIZATION radio_station Evri/Organization/Entertainment/Company/Radio_Station
CONCEPT constitutional_amendment Evri/Concept/Politics/Constitutional_Amendment
PERSON australian_rules_footballer Evri/Person/Sports/Athlete/Australian_Rules_Footballer
ORGANIZATION australian_rules_football_team
Evri/Organization/Sports/Australian_Rules_Football_Team
ORGANIZATION criminal_organization Evri/Organization/Criminal_Organization
PERSON poker_player Evri/Person/Poker_Player
PERSON bowler Evri/Person/Sports/Athlete/Bowler
PERSON yacht_racer Evri/Person/Sports/Athlete/Yacht_Racer
PERSON water_polo_player Evri/Person/Sports/Athlete/Water_Polo_Player
PERSON field_hockey_player Evri/Person/Sports/Athlete/Field_Hockey_Player
PERSON skateboarder Evri/Person/Sports/Athlete/Skateboarder
PERSON polo_player Evri/Person/Sports/Athlete/Polo_Player
PERSON gaelic_footballer Evri/Person/Sports/Athlete/Gaelic_Footballer
PRODUCT programming_language Evri/Product/Technology/Programming_Language
PERSON engineer Evri/Person/Technology/Engineer
EVENT cybercrime Evri/Event/Technology/Cybercrime
EVENT criminal_act Evri/Event/Criminal_Act
PERSON critic Evri/Person/Critic
PERSON pool_player Evri/Person/Pool_Player
PERSON snooker_player Evri/Person/Snooker_Player
PERSON competitive_eater Evri/Person/Competitive_Eater
PRODUCT data_storage_medium Evri/Product/Technology/Data_Storage_Medium
PRODUCT data_storage_device Evri/Product/Technology/Data_Storage_Device
PERSON mountain_climber Evri/Person/Mountain_Climber
PERSON aviator Evri/Person/Aviator
ORGANIZATION cooperative Evri/Organization/Cooperative
CONCEPT copyright_license Evri/Concept/Copyright_License
EVENT observance Evri/Event/Observance
PERSON outdoor_sportsperson Evri/Person/Sports/Outdoor_Sportsperson
PERSON rodeo_performer Evri/Person/Sports/Rodeo_Performer
PERSON sports_shooter Evri/Person/Sports/Athlete/Sports_Shooter
CONCEPT award Evri/Concept/Award
CONCEPT entertainment_series Evri/Concept/Entertainment/Entertainment_Series
PERSON chef Evri/Person/Chef
PERSON cartoonist Evri/Person/Entertainment/Cartoonist
PERSON comics_creator Evri/Person/Entertainment/Comics_Creator
PERSON nobility Evri/Person/Nobility
PERSON porn_star Evri/Person/Porn_Star
PERSON archaeologist Evri/Person/Scientist/Archaeologist
PERSON paleontologist Evri/Person/Scientist/Paleontologist
PERSON victim_of_crime Evri/Person/Victim_of_Crime
LOCATION region Evri/Location/Region
PERSON linguist Evri/Person/Linguist
PERSON librarian Evri/Person/Librarian
PERSON bridge_player Evri/Person/Bridge_Player
PERSON choreographer Evri/Person/Entertainment/Choreographer
PRODUCT camera Evri/Product/Technology/Camera
PRODUCT publication Evri/Product/Publication
PRODUCT comic Evri/Product/Entertainment/Comic
PRODUCT short_story Evri/Product/Entertainment/Short_Story
ORGANIZATION irregular_military_organization
Evri/Organization/Irregular_Military_Organization
SUBSTANCE chemical_element Evri/Substance/Chemical_Element
SUBSTANCE alkaloid Evri/Substance/Organic_Compound/Alkaloid
SUBSTANCE glycoside Evri/Substance/Glycoside
SUBSTANCE amino_acid Evri/Substance/Amino_Acid
SUBSTANCE protein Evri/Substance/Protein
SUBSTANCE enzyme Evri/Substance/Enzyme
```

TABLE 2-continued

```
SUBSTANCE hormone Evri/Substance/Hormone
SUBSTANCE hydrocarbon Evri/Substance/Organic_Compound/Hydrocarbon
SUBSTANCE inorganic_compound Evri/Substance/Inorganic_Compound
SUBSTANCE lipid Evri/Substance/Organic_Compound/Lipid
SUBSTANCE steroid Evri/Substance/Organic_Compound/Lipid/Steroid
SUBSTANCE molecule Evri/Substance/Molecule
SUBSTANCE polymer Evri/Substance/Molecule/Polymer
SUBSTANCE terpene Evri/Substance/Organic_Compound/Terpene
SUBSTANCE toxin Evri/Substance/Toxin
SUBSTANCE antibiotic Evri/Substance/Health/Antibiotic
SUBSTANCE antioxidant Evri/Substance/Health/Antioxidant
SUBSTANCE anti-inflammatory Evri/Substance/Health/Anti-inflammatory
SUBSTANCE antiasthmatic_drug Evri/Substance/Health/Antiasthmatic_drug
SUBSTANCE anticonvulsant Evri/Substance/Health/Anticonvulsant
SUBSTANCE antihistamine Evri/Substance/Health/Antihistamine
SUBSTANCE antihypertensive Evri/Substance/Health/Antihypertensive
SUBSTANCE antiviral Evri/Substance/Health/Antiviral
SUBSTANCE painkiller Evri/Substance/Health/Painkiller
SUBSTANCE Painkiller Evri/Substance/Health/Painkiller
SUBSTANCE anesthetic Evri/Substance/Health/Anesthetic
SUBSTANCE antibody Evri/Substance/Antibody
SUBSTANCE chemotherapeutic_drug Evri/Substance/Health/Chemotherapeutic
SUBSTANCE anti-diabetic_drug Evri/Substance/Health/Anti-diabetic
SUBSTANCE antianginal_drug Evri/Substance/Health/Antianginal
SUBSTANCE muscle_relaxant Evri/Substance/Health/Muscle_relaxant
SUBSTANCE hypolipidemic_drug Evri/Substance/Health/Hypolipidemic_Drug
SUBSTANCE psychoactive_drug Evri/Substance/Health/Psychoactive_Drug
SUBSTANCE vaccine Evri/Substance/Health/Vaccine
SUBSTANCE gastrointestinal_drug Evri/Substance/Health/Gastrointestinal_Drug
SUBSTANCE erectile_dysfunction_drug Evri/Substance/Health/Erectile_Dysfunction_Drug
SUBSTANCE organometallic_compound
Evri/Substance/Organic_Compound/Organometallic_Compound
SUBSTANCE phenol Evri/Substance/Organic_Compound/Phenol
SUBSTANCE ketone Evri/Substance/Organic_Compound/Ketone
SUBSTANCE amide Evri/Substance/Organic_Compound/Amide
SUBSTANCE ester Evri/Substance/Organic_Compound/Ester
SUBSTANCE ether Evri/Substance/Organic_Compound/Ether
SUBSTANCE heterocyclic_compound
Evri/Substance/Organic_Compound/Heterocyclic_Compound
SUBSTANCE organic_compound Evri/Substance/Organic_Compound
SUBSTANCE carbohydrate Evri/Substance/Organic_Compound/Carbohydrate
SUBSTANCE peptide Evri/Substance/Organic_Compound/Peptide
SUBSTANCE organohalide Evri/Substance/Organic_Compound/Organohalide
SUBSTANCE organosulfur_compound
Evri/Substance/Organic_Compound/Organosulfur_Compound
SUBSTANCE aromatic_compound Evri/Substance/Organic_Compound/Aromatic_Compound
SUBSTANCE carboxylic_acid Evri/Substance/Organic_Compound/Carboxylic_Acid
SUBSTANCE nucleic_acid Evri/Substance/Nucleic_Acid
SUBSTANCE ion Evri/Substance/Ion
ORGANISM cyanobacterium Evri/Organism/Health/Cyanobacterium
ORGANISM gram-positive_bacterium Evri/Organism/Health/Gram-positive_Bacterium
ORGANISM gram-negative_bacterium Evri/Organism/Health/Gram-negative_Bacterium
ORGANISM acid-fast_bacterium Evri/Organism/Health/Acid-fast_Bacterium
ORGANISM dna_virus Evri/Organism/Health/DNA_Virus
ORGANISM rna_virus Evri/Organism/Health/RNA_Virus
CONDITION symptom Evri/Condition/Health/Symptom
CONDITION injury Evri/Condition/Health/Injury
CONDITION inflammation Evri/Condition/Health/Inflammation
CONDITION disease Evri/Condition/Health/Disease
CONDITION cancer Evri/Condition/Health/Disease/Cancer
ORGANISM medicinal_plant Evri/Organism/Health/Medicinal_Plant
ORGANISM poisonous_plant Evri/Organism/Poisonous_Plant
ORGANISM herb Evri/Organism/Herb
CONCEPT medical_procedure Evri/Concept/Health/Medical_Procedure
ORGANISM bacterium Evri/Organism/Health/Bacterium
ORGANISM virus Evri/Organism/Health/Virus
ORGANISM horse Evri/Organism/Horse
PERSON fugitive Evri/Person/Fugitive
ORGANIZATION military_unit Evri/Organization/Politics/Military_Unit
ORGANIZATION law_enforcement_agency
Evri/Organization/Politics/Law_Enforcement_Agency
LOCATION golf_course Evri/Location/Golf_Course
PERSON law_enforcement_agent Evri/Person/Politics/Law_Enforcement_Agent
PERSON magician Evri/Person/Entertainment/Magician
LOCATION educational_institution Evri/Organization/Educational_Institution
CONCEPT social_program Evri/Concept/Politics/Social_Program
EVENT international_conference Evri/Event/Politics/International_Conference
```

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/383,175, entitled "RECOMMENDING MOBILE DEVICE ACTIVITIES," filed Sep. 15, 2010, is incorporated herein by reference, in its entirety.

From the foregoing it will be appreciated that, although specific embodiments have been described herein for purposes of illustration, various modifications may be made without deviating from the spirit and scope of this disclosure. For example, the methods, techniques, and systems for activity recommendation are applicable to other architectures. For example, instead of recommending activities for mobile devices, the techniques may be used to automatically generate reviews, lists, or groupings of mobile applications that can be browsed by users. Also, the methods, techniques, and systems discussed herein are applicable to differing query languages, protocols, communication media (optical, wireless, cable, etc.) and devices (e.g., desktop computers wireless handsets, electronic organizers, personal digital assistants, portable email machines, game machines, pagers, navigation devices such as GPS receivers, etc.).

The invention claimed is:

1. A method for recommending mobile device activities, the method comprising:
   receiving an indication of a content item contained on a Web page that is currently presented by a mobile device;
   determining semantic information about the indicated content item, including accessing a semantic network that is a graph data structure that includes multiple entities that each have is-a and/or member-of relations to other entities or categories of the semantic network, wherein the is-a and/or member-of relations are represented as links between the entities or categories of the semantic network, to:
   identify one or more entities in the semantic network that are referenced by the indicated content item and relationships relating to the identified entities;
   identify one or more entities in the semantic network that are related to the identified one or more entities; and
   identify one or more categories in the semantic network that are associated with the identified one or more entities and/or the related one or more entities, wherein the identified one or more categories are part of a taxonomic hierarchy in which each of the identified one or more categories is part of a corresponding taxonomic path that includes multiple categories related to one another via is-a relations, wherein the one or more categories are identified by traversing the links representing relations within the semantic network by traversing at most N taxonomic paths within the semantic network, where N is determined by user setting or data mining;
   determining a plurality of mobile device activities, wherein each activity has one or more associated entities and/or categories in common with the determined semantic information; and
   transmitting information about the determined plurality of activities.

2. The method of claim 1 wherein determining the semantic information about the indicated content item includes processing text of the Web page to identify the one or more entities referenced by the indicated content item.

3. The method of claim 1 wherein determining the semantic information about the indicated content item includes accessing the semantic network to identify the one or more entities related to the identified one or more entities referenced by the indicated content item.

4. The method of claim 1 wherein determining the semantic information about the indicated content item includes accessing the semantic network to identify the one or more categories associated with the identified one or more entities and/or the related one or more entities.

5. The method of claim 1, further comprising:
   processing a corpus of text documents to generate the semantic network that represents a plurality of entities, relationships between entities of the plurality of entities, and categories associated with entities of the plurality of entities.

6. The method of claim 1 wherein determining the plurality of activities includes determining a mobile application that is configured to be executed on the mobile device and that provides functions that are related to the content item.

7. The method of claim 1, further comprising:
   determining entities and categories associated with the plurality of mobile device activities by processing information about a plurality of mobile device applications, the information including at least one of a name, a summary, a description, a review, a rating, and an identifier; and
   determining whether the determined semantic information about the indicated content item includes one or more of the determined entities and categories associated with the plurality of mobile device applications.

8. The method of claim 1 wherein determining the plurality of mobile device activities includes determining at least one mobile Website that is configured to be accessed by the mobile device and that provides functions related to the content item.

9. The method of claim 1 wherein the determining the plurality of mobile device activities includes accessing at least one mobile Website, and further comprising:
   determining entities and categories associated with a plurality of mobile Web sites by processing text content from the plurality of mobile Web sites; and
   determining whether the determined semantic information about the indicated content item includes one or more of the determined entities and categories associated with the plurality of mobile Web sites.

10. The method of claim 1 wherein the content item is at least one of a Web page, an audio item, and a video item.

11. The method of claim 1 wherein transmitting the information about the determined plurality of activities includes presenting an indication of one or more of the plurality of activities on a display of the mobile device.

12. A non-transitory computer-readable medium having contents that, when executed by a computing system, enable the computing system to recommend mobile device activities, by performing a method comprising:
   receiving an indication of a content item contained on a Web page that is currently presented by a mobile device;
   determining semantic information about the indicated content item, including accessing a semantic network that is a graph data structure that includes multiple entities that each have is-a and/or member-of relations to other entities or categories of the semantic network, wherein the is-a and/or member-of relations are represented as links between the entities or categories of the semantic network, to:
   identify one or more entities in the semantic network that are referenced by the indicated content item and relationships relating to the identified entities;

identify one or more entities in the semantic network that are related to the identified one or more entities; and identify one or more categories in the semantic network that are associated with the identified one or more entities and/or the related one or more entities, wherein the identified one or more categories are part of a taxonomic hierarchy in which each of the identified one or more categories is part of a corresponding taxonomic path that includes multiple categories related to one another via is-a relations, wherein the one or more categories are identified by traversing the links representing relations within the semantic network by traversing at most N taxonomic paths within the semantic network, where N is determined by user setting or data mining;

determining a plurality of mobile device activities, wherein each activity has one or more associated entities and/or categories in common with the determined semantic information; and transmitting information about the determined plurality of activities.

13. The computer-readable medium of claim 12 wherein the method further comprises:

determining entities and categories associated with the plurality of mobile device activities by processing information about a plurality of mobile device applications, the information including at least one of a name, a summary, a description, a review, a rating, and an identifier; and determining whether the determined semantic information about the indicated content item includes one or more of the determined entities and categories associated with the plurality of mobile device applications.

14. A computing system configured to recommend content, comprising:

a memory;

a module that is stored on the memory and that is configured, when executed, to:

receive an indication of a content item contained on a Web page that is currently presented by a mobile device;

determine semantic information about the indicated content item, including accessing a semantic network that is a graph data structure that includes multiple entities that each have is-a and/or member-of relations to other entities or categories of the semantic network, wherein the is-a and/or member-of relations are represented as links between the entities or categories of the semantic network, to:

identify one or more entities in the semantic network that are referenced by the indicated content item and relationships relating to the identified entities;

identify one or more entities in the semantic network that are related to the identified one or more entities; and identify one or more categories in the semantic network that are associated with the identified one or more entities and/or the related one or more entities, wherein the identified one or more categories are part of a taxonomic hierarchy in which each of the identified one or more categories is part of a corresponding taxonomic path that includes multiple categories related to one another via is-a relations, wherein the one or more categories are identified by traversing the links representing relations within the semantic network by traversing at most N taxonomic paths within the semantic network, where N is determined by user setting or data mining;

determine a plurality of mobile device activities, wherein each activity has one or more associated entities and/or categories in common with the determined semantic information; and transmit information about the determined plurality of activities.

15. The method of claim 1, further comprising:

traversing the links representing the is-a relations and member-of relations within the semantic network to identify the entity that is associated with the at least one activity and that is not directly referenced by the content item but that is in a relationship with the entity that is directly referenced by the content item.

16. The method of claim 1 wherein at least one of the activities has an associated category that is not the category of any entity that is directly referenced by the content item but that is the category of an entity that is in a relationship with an entity that is directly referenced by the content item.

17. The method of claim 16 further comprising:

traversing the links representing the is-a relations and member-of relations within the semantic network to identify the category that is associated with the at least one activity and that is not the category of any entity that is directly referenced by the content item but that is the category of the entity that is in a relationship with the entity that is directly referenced by the content item.

18. The method of claim 1 further comprising:

ranking the plurality of mobile device activities based at least in part on a location entity of the user matching a location entity associated with each activity.

19. The method of claim 2 further comprising:

presenting on the mobile device an activity recommender user interface that includes multiple user interface controls that are each configured to initiate one of the determined plurality of activities.

20. The method of claim 1 wherein the entities of the semantic network each have a corresponding entity type, and wherein the corresponding entity types include person, organization, location, concept, event, and product.

* * * * *